US011867880B2

(12) United States Patent
Wang et al.

(10) Patent No.: US 11,867,880 B2
(45) Date of Patent: Jan. 9, 2024

(54) OPTICAL IMAGING SYSTEM

(71) Applicant: Zhejiang Sunny Optical Co., Ltd, Ningbo (CN)

(72) Inventors: Xiaofang Wang, Ningbo (CN); Biao Xu, Ningbo (CN); Kaiyuan Zhang, Ningbo (CN); Fujian Dai, Ningbo (CN); Liefeng Zhao, Ningbo (CN)

(73) Assignee: Zhejiang Sunny Optical Co., Ltd, Ningbo (CN)

( * ) Notice: Subject to any disclaimer, the term of this patent is extended or adjusted under 35 U.S.C. 154(b) by 585 days.

(21) Appl. No.: 17/038,199

(22) Filed: Sep. 30, 2020

(65) Prior Publication Data

US 2021/0132340 A1 May 6, 2021

(30) Foreign Application Priority Data

Nov. 5, 2019 (CN) ......................... 201911071488.6

(51) Int. Cl.
*G02B 13/00* (2006.01)
*G02B 9/64* (2006.01)
*G02B 27/00* (2006.01)

(52) U.S. Cl.
CPC ........... *G02B 13/0045* (2013.01); *G02B 9/64* (2013.01); *G02B 27/0025* (2013.01)

(58) Field of Classification Search
CPC .. G02B 13/0045; G02B 9/64; G02B 27/0025; G02B 13/18; G02B 13/06
See application file for complete search history.

(56) References Cited

U.S. PATENT DOCUMENTS 10,012,818 B2 * 7/2018 Tang ...................... G02B 13/06
10,247,913 B2 * 4/2019 Tang .................. G02B 13/0045
2020/0363611 A1 * 11/2020 Huang ............... G02B 27/0025

FOREIGN PATENT DOCUMENTS

CN 204832662 U 12/2015
CN 108710193 A 10/2018
CN 108732724 A 11/2018
CN 109828361 A 5/2019
CN 110082890 A * 8/2019 ......... G02B 13/0045
CN 110262007 A 9/2019
CN 110673308 A * 1/2020 ......... G02B 13/0045

OTHER PUBLICATIONS

Office Action issued in corresponding Chinese Application 202110818811.2 dated Feb. 28, 2022.

* cited by examiner

*Primary Examiner* — Christopher Stanford
(74) *Attorney, Agent, or Firm* — Sughrue Mion, PLLC

(57) ABSTRACT

The present disclosure discloses an optical imaging system, sequentially from an object side to an image side of the optical imaging system along an optical axis, including: a first lens having refractive power; a second lens having negative refractive power; a third lens having refractive power; a fourth lens having positive refractive power; a fifth lens having refractive power; a sixth lens having refractive power; and a seventh lens having refractive power, a concave object-side surface, and a concave image-side surface. Half of a diagonal length ImgH of an effective pixel area on an imaging plane of the optical imaging system may satisfy ImgH>6.0 mm. A total effective focal length f of the optical imaging system and an entrance pupil diameter EPD of the optical imaging system may satisfy f/EPD<1.9.

20 Claims, 24 Drawing Sheets

E1 E2 E3 E4 E5 E6 E7 E8
STO
S1 S2 S3 S4 S5 S6 S7 S8 S9 S10 S11 S12 S13 S14 S15 S16 S17

Lateral Color Curve 1
0.9
0.8
0.7
0.6
0.5
0.4
0.3
0.2
0.1
0

-7.5 -5 -2.5 0 2.5 5 7.5

(Micrometer)

Longitudinal Aberration Curve (Millimeter)

Astigmatic Curve (Millimeter)

OPTICAL IMAGING SYSTEM

CROSS-REFERENCE TO RELATED APPLICATION

This application claims benefit of priority to Chinese Patent Application No. 201911071488.6 filed on Nov. 5, 2019 before the China National Intellectual Property Administration, the entire disclosure of which is incorporated herein by reference in its entity.

TECHNICAL FIELD

The present disclosure relates to the field of optical elements, and more specifically, relates to an optical imaging system.

BACKGROUND

In recent years, with the upgrading of portable electronic products, market demand for optical imaging systems suitable for the portable electronic products has gradually increased. For example, the camera module on the back of the mobile phone is usually a multi-camera camera module, and the multi-camera camera module may include two, three or more sets of optical imaging systems. Each optical imaging system focuses on different optical performance, but there is usually one of the optical imaging systems used as the main camera.

The continuous development of image software functions and video software functions on the portable electronic product makes it necessary to apply an optical imaging system with higher optical performance to the portable electronic product such as mobile phone. However, the size of the portable electronic product, such as mobile phone, is small, so it is difficult to design a high-performance optical imaging system suitable for the mobile phone. Moreover, as the number of lenses of the optical imaging system increases, the design difficulty of the optical imaging system will be further increased.

In order to meet the requirements of miniaturization and imaging, an optical imaging system with characteristics of miniaturization, large imaging plane, large wide-angle, and large aperture is required.

SUMMARY

The present disclosure provides an optical imaging system that is applicable to portable electronic products and at least solves or partially solves at least one of the above disadvantages of the prior art.

The present disclosure provides an optical imaging system which includes, sequentially from an object side to an image side along an optical axis, a first lens having refractive power; a second lens having negative refractive power; a third lens having refractive power; a fourth lens having positive refractive power; a fifth lens having refractive power; a sixth lens having refractive power; and a seventh lens having refractive power, an object-side surface thereof is a concave surface, and an image-side surface thereof is a concave surface.

In one embodiment, half of a diagonal length ImgH of an effective pixel area on an imaging plane of the optical imaging system may satisfy ImgH>6.0 mm.

In one embodiment, a distance TTL along the optical axis from an object-side surface of the first lens to an imaging plane of the optical imaging system, and an entrance pupil diameter EPD of the optical imaging system may satisfy TTL/EPD<2.5.

In one embodiment, a total effective focal length f of the optical imaging system and an effective focal length f6 of the sixth lens may satisfy 1.15<f6/f<1.65.

In one embodiment, an effective focal length f1 of the first lens, and an effective focal length f6 of the sixth lens may satisfy 1.3<f6/f1<1.7.

In one embodiment, a distance SAG42 along the optical axis from an intersection of an image-side surface of the fourth lens and the optical axis to a vertex of an effective radius of the image-side surface of the fourth lens, and a distance SAG51 along the optical axis from an intersection of an object-side surface of the fifth lens and the optical axis to a vertex of an effective radius of the object-side surface of the fifth lens may satisfy 1.2<SAG51/SAG42<2.5.

In one embodiment, a radius of curvature R3 of an object-side surface of the second lens and a total effective focal length f of the optical imaging system may satisfy 1.3<R3/f<3.

In one embodiment, a spaced interval T34 between the third lens and the fourth lens along the optical axis and an edge thickness ET6 of the sixth lens may satisfy 0.221 T34/ET6<0.6.

In one embodiment, a radius of curvature R9 of an object-side surface of the fifth lens and a radius of curvature R10 of an image-side surface of the fifth lens may satisfy 1.5<(R9+R10)/R10<2.3.

In one embodiment, an effective focal length f1 of the first lens and an effective focal length f2 of the second lens may satisfy −6.0<f2/f1<−2.5.

In one embodiment, a total effective focal length f of the optical imaging system and an entrance pupil diameter EPD of the optical imaging system may satisfy f/EPD<1.9.

In one embodiment, half of a diagonal length ImgH of an effective pixel area on an imaging plane of the optical imaging system and a distance TTL along the optical axis from an object-side surface of the first lens to the imaging plane of the optical imaging system may satisfy TTL/ImgH<1.2.

In one embodiment, a combined focal length f123 of the first to the third lenses and a total effective focal length f of the optical imaging system may satisfy 1.0<f123/f<1.5.

In one embodiment, a distance SAG61 along the optical axis from an intersection f an object-side surface of the sixth lens and the optical axis to a vertex of an effective radius of the object-side surface of the sixth lens, a distance SAG62 along the optical axis from an intersection of an image-side surface of the sixth lens and the optical axis to a vertex of an effective radius of the image-side surface of the sixth lens, and a distance SAG71 along the optical axis from an intersection of an object-side surface of the seventh lens and the optical axis to a vertex of an effective radius of the object-side surface of the seventh lens may satisfy −4<SAG61/(SAG62-SAG71)<−1.

In one embodiment, a spaced interval T23 between the second lens and the third lens along the optical axis and a spaced interval T34 between the third lens and the fourth lens along the optical axis may satisfy 1.7<T23/T34<3.7.

In one embodiment, an object-side surface of the fifth lens may be a convex surface.

In one embodiment, an object-side surface of the sixth lens may be a convex surface.

The present disclosure employs seven lenses, and the optical imaging system has at least one beneficial effect, such as miniaturization, large imaging plane, large wide angle, large aperture and the like, by rationally configuring the refractive power, the surface shape, the center thickness of each lens, and the on-axis spaced interval between the lenses and the like.

BRIEF DESCRIPTION OF THE DRAWINGS

Other features, objects, and advantages of the present disclosure will become more apparent from the following detailed description of the non-limiting embodiments with reference to the accompanying drawings. In the drawings.

DETAILED DESCRIPTION OF EMBODIMENTS

Figure 1:
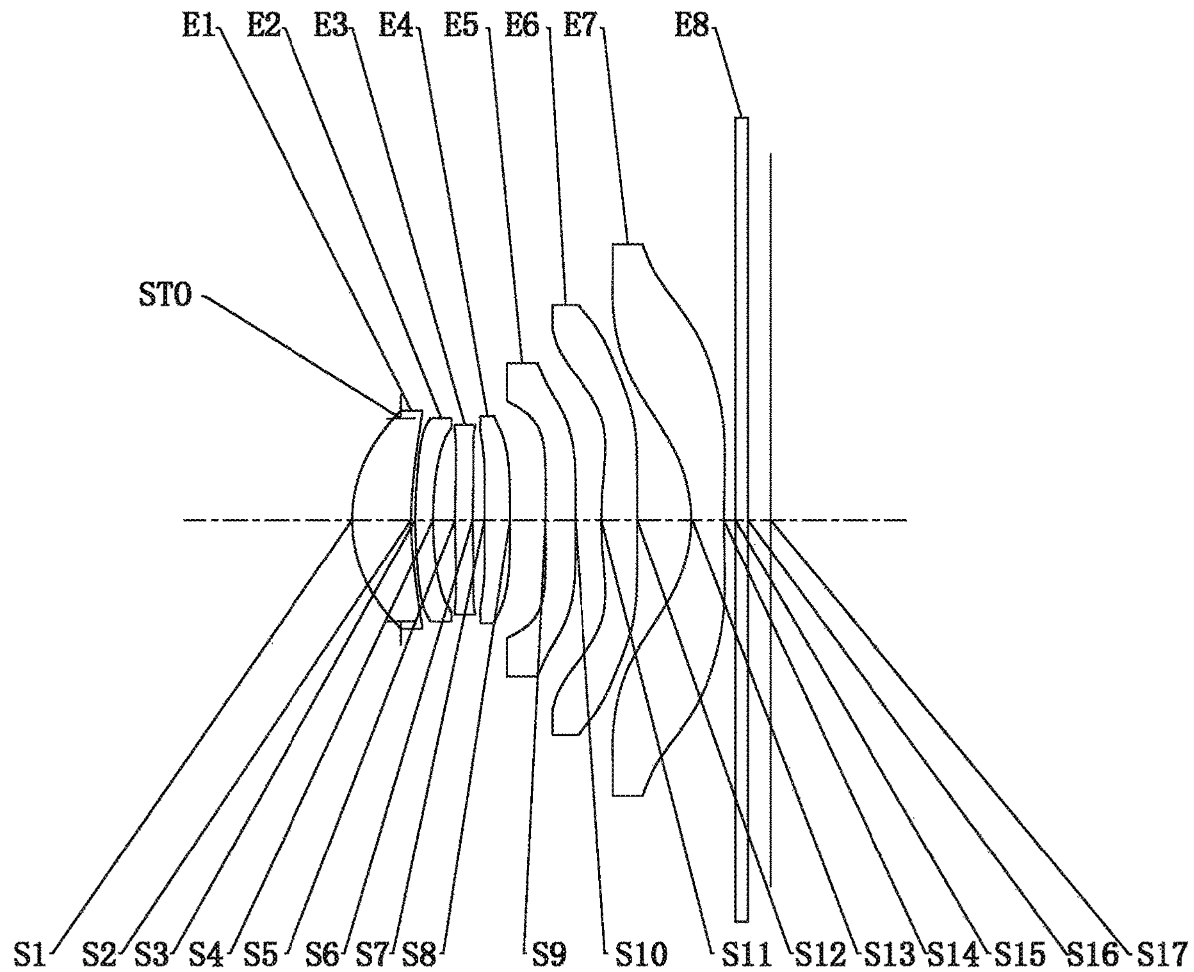
FIG. 1 illustrates a schematic structural view of an optical imaging lens assembly according to Example 1 of the present disclosure.

For a better understanding of the present disclosure, various aspects of the present disclosure will be described in more detail with reference to the accompanying drawings. It should be understood that the detailed description is merely illustrative of the exemplary embodiments of the present disclosure and is not intended to limit the scope of the present disclosure in any way. Throughout the specification, the same reference numerals refer to the same elements. The expression "and/or" includes any and all combinations of one or more of the associated listed items.

It should be noted that in the present specification, the expressions such as first, second, third are used merely for distinguishing one feature from another, without indicating any limitation on the features. Thus, a first lens discussed below may also be referred to as a second lens or a third lens without departing from the teachings of the present disclosure.

In the accompanying drawings, the thickness, size and shape of the lens have been somewhat exaggerated for the convenience of explanation. In particular, shapes of spherical surfaces or aspheric surfaces shown in the accompanying drawings are shown by way of example. That is, shapes of the spherical surfaces or the aspheric surfaces are not limited to the shapes of the spherical surfaces or the aspheric surfaces shown in the accompanying drawings. The accompanying drawings are merely illustrative and not strictly drawn to scale.

Herein, the paraxial area refers to an area near the optical axis. If a surface of a lens is a convex surface and the position of the convex is not defined, it indicates that the surface of the lens is convex at least in the paraxial region; and if a surface of a lens is a concave surface and the position of the concave is not defined, it indicates that the surface of the lens is concave at least in the paraxial region. In each lens, the surface closest to the object is referred to as an object-side surface of the lens, and the surface closest to the imaging plane is referred to as an image-side surface of the lens.

It should be further understood that the terms "comprising," "including," "having," "containing" and/or "contain," when used in the specification, specify the presence of stated features, elements and/or components, but do not exclude the presence or addition of one or more other features, elements, components and/or combinations thereof. In addition, expressions, such as "at least one of," when preceding a list of features, modify the entire list of features rather than an individual element in the list. Further, the use of "may," when describing embodiments of the present disclosure, refers to "one or more embodiments of the present disclosure." Also, the term "exemplary" is intended to refer to an example or illustration.

Unless otherwise defined, all terms (including technical and scientific terms) used herein have the same meaning as commonly understood by those of ordinary skill in the art to which the present disclosure belongs. It will be further understood that terms, such as those defined in commonly used dictionaries, should be interpreted as having a meaning that is consistent with the meaning in the context of the relevant art and will not be interpreted in an idealized or overly formal sense, unless expressly so defined herein.

It should also be noted that, the examples in the present disclosure and the features in the examples may be combined with each other on a non-conflict basis. The present disclosure will be described in detail below with reference to the accompanying drawings and in combination with the examples.

The features, principles, and other aspects of the present disclosure are described in detail below.

An optical imaging system according to an exemplary embodiment of the present disclosure may include seven lenses, i.e. a first lens, a second lens, a third lens, a fourth lens, a fifth lens, a sixth lens and a seventh lens. Each of the first to the seventh lenses has refractive power. The seven lenses are arranged sequentially from an object side to an image side along an optical axis. Among the first lens to the seventh lens, there may be an air interval between each two adjacent lenses.

In an exemplary embodiment, the first lens has positive or negative refractive power. The second lens may have negative refractive power. The third lens has positive or negative refractive power. The fourth lens may have positive refractive power. The fifth lens has positive or negative refractive power. The sixth lens has positive or negative refractive power. The seventh lens has positive or negative refractive power, an object-side surface thereof is a concave surface, and an image-side surface thereof is a concave surface. The low-order aberrations of the system are effectively compensated by rationally controlling the positive or negative distribution of the refractive power and the surface curvature of each lens in the system.

In an exemplary embodiment, an object-side surface of the fifth lens may be a convex surface. Exemplarily, an object-side surface of the sixth lens may be a convex surface. By controlling the shape of each lens, it is beneficial to reduce the tolerance sensitivity of the optical imaging system and maintain the miniaturization of the optical imaging system.

In an exemplary embodiment, the optical imaging system according to the present disclosure may satisfy $TTL/ImgH<1.2$, where ImgH is half of a diagonal length of an effective pixel area on an imaging plane of the optical imaging system, and TTL is a distance along the optical axis from an object-side surface of the first lens to the imaging plane of the optical imaging system. In an exemplary embodiment, the optical imaging system according to the present disclosure may satisfy $ImgH>6.0$ mm. More specifically, the optical imaging system may satisfy 6.0 mm$<ImgH<$6.2 mm and $1.15<TTL/ImgH<1.19$. On the basis of reasonable control of the shape and refractive power of each lens of the optical imaging system, the optical imaging system can be made compact, small in size, and has the characteristics of high pixels by limiting the image height and total optical length of the optical imaging system.

In an exemplary embodiment, the optical imaging system according to the present disclosure may satisfy $1.15<f6/f<1.65$, where f6 is an effective focal length of the sixth lens, and f is a total effective focal length of the optical imaging system. More specifically, f6 and f may satisfy $1.18<f6/f<1.60$. By constraining the ratio of the effective focal length of the sixth lens to the total effective focal length, it is beneficial to constrain the field curvature of the optical imaging system, thereby enabling the optical imaging system to have better resolution.

In an exemplary embodiment, the optical imaging system according to the present disclosure may satisfy $1.3<f6/f1<1.7$, where f1 is an effective focal length of the first lens, and f6 is an effective focal length of the sixth lens. More specifically, f1 and f6 may satisfy $1.33<f6/f1<1.68$. By limiting the ratio of the effective focal length of the sixth lens to the effective focal length of the first lens, it is beneficial to control the contribution of the sixth lens to the spherical aberration of the optical imaging system and control the contribution of the first lens to the spherical aberration of the optical imaging system, thereby enabling the on-axis field of view of the optical imaging system to have good imaging quality.

In an exemplary embodiment, the optical imaging system according to the present disclosure may satisfy $1.2<SAG51/SAG42<2.5$, where SAG42 is a distance along the optical axis from an intersection of an image-side surface of the fourth lens and the optical axis to a vertex of an effective radius of the image-side surface of the fourth lens, and SAG51 is a distance along the optical axis from an intersection of an object-side surface of the fifth lens and the optical axis to a vertex of an effective radius of the object-side surface of the fifth lens. More specifically, SAG42 and SAG51 may satisfy $1.35<SAG51/SAG42<2.48$. By limiting the ratio of the sagittal height of the object-side surface of the fifth lens to the sagittal height of the image-side surface of the fourth lens, it is beneficial to control the shape of the fourth lens and the fifth lens, so that the manufacturability of the fourth lens and the fifth lens is improved. Meanwhile, it is beneficial to the processing and molding of the fourth lens and the fifth lens and the assembly of the lenses. It is also beneficial to control the deflection angle of the light of the optical imaging system, thereby improving the adaptability of the optical imaging system and the image sensor chip.

In an exemplary embodiment, the optical imaging system according to the present disclosure may satisfy $1.3<R3/f<3$, where R3 is a radius of curvature of an object-side surface of the second lens, and f is a total effective focal length of the optical imaging system. More specifically, R3 and f may satisfy $1.33<R3/f<2.90$. By limiting the ratio of the radius of curvature of the object-side surface of the second lens to the total effective focal length, the deflection of the light entering the optical imaging system at the second lens may be effectively controlled, so that the optical imaging system has high aberration correction ability. In addition, the second lens may also have better manufacturability.

In an exemplary embodiment, the optical imaging system according to the present disclosure may satisfy $0.2<T34/ET6<0.6$, where T34 is a spaced interval between the third lens and the fourth lens along the optical axis, and ET6 is an edge thickness of the sixth lens. More specifically, T34 and ET6 may satisfy $0.30<T34/ET6<0.56$. By limiting the ratio of the distance between the third lens and the fourth lens along the optical axis to the edge thickness of the sixth lens, it is beneficial to control the field curvature in each field of view, so that the optical imaging system has good imaging quality and low sensitivity. In addition, it helps to improve the workability of the sixth lens.

In an exemplary embodiment, the optical imaging system according to the present disclosure may satisfy $1.5<(R9+R10)/R10<2.3$, where R9 is a radius of curvature of an object-side surface of the fifth lens, and R10 is a radius of curvature of an image-side surface of the fifth lens. More specifically, R9 and R10 may satisfy $1.6<(R9+R10)/R10<2.2$. By limiting the radii of curvature on both sides of the fifth lens, the shape of the fifth lens can be effectively controlled, so that the fifth lens has better workability. At the same time, the refraction angle of the light beam entering the optical imaging system at the fifth lens can be controlled, so that the adaptability of the optical imaging system and the image sensor chip is better.

In an exemplary embodiment, the optical imaging system according to the present disclosure may satisfy $-6.0<f2/f1<-2.5$, where f1 is an effective focal length of the first lens, and f2 is an effective focal length of the second lens. More specifically, f1 and f2 may satisfy $-5.6<f2/f1<-2.7$. By controlling the ratio of the effective focal length of the second lens to the effective focal length of the first lens, it is beneficial to control the field curvature contribution of the first lens and the field curvature contribution of the second lens. The curvature of field generated by the first lens and the curvature of field generated by the second lens may compensate each other.

In an exemplary embodiment, the optical imaging system according to the present disclosure may satisfy f/EPD<1.9, where f is a total effective focal length of the optical imaging system and EPD is an entrance pupil diameter of the optical imaging system. More specifically, f and EPD may satisfy 1.70<f/EPD<1.89. By limiting the ratio of the total effective focal length to the entrance pupil diameter, it is beneficial to increase the light flux of the optical imaging system, which can reduce the edge field of view aberration and enhance the imaging effect of the optical imaging system in a dark environment. The optical imaging system configured as above has the advantage of a large aperture.

In an exemplary embodiment, the optical imaging system according to the present disclosure may satisfy TTL/EPD<2.5, where TTL is a distance along the optical axis from an object-side surface of the first lens to an imaging plane of the optical imaging system, and EPD is an entrance pupil diameter of the optical imaging system. More specifically, TTL and EPD may satisfy 1.90<TTL/EPD<2.19. By limiting the ratio of the total optical length of the optical imaging system to the entrance pupil diameter, the size of the optical imaging system can be effectively compressed to maintain the ultra-thin characteristics of the optical imaging system. The optical imaging system configured as above has the characteristics of miniaturization.

In an exemplary embodiment, the optical imaging system according to the present disclosure may satisfy 1.0<f123/f<1.5, where f123 is a combined focal length of the first to the third lenses, and f is a total effective focal length of the optical imaging system. More specifically, f123 and f may satisfy 1.10<f123/f<1.45. By limiting the ratio of the combined focal length of the first to the third lenses to the total effective focal length, the spherical aberration generated by the third lens and the lenses on the object side thereof can be effectively compensated. The image quality of the on-axis field of view of the optical imaging system is improved, so that the optical imaging system has better image quality.

In an exemplary embodiment, the optical imaging system according to the present disclosure may satisfy −4<SAG61/(SAG62-SAG71 )<−1, where SAG61 is a distance along the optical axis from an intersection of an object-side surface of the sixth lens and the optical axis to a vertex of an effective radius of the object-side surface of the sixth lens, SAG62 is a distance along the optical axis from an intersection of an image-side surface of the sixth lens and the optical axis to a vertex of an effective radius of the image-side surface of the sixth lens, and SAG71 is a distance along the optical axis from an intersection of an object-side surface of the seventh lens and the optical axis to a vertex of an effective radius of the object-side surface of the seventh lens. More specifically, SAG61, SAG62 and SAG71 may satisfy −3.7<SAG61/(SAG62-SAG71)<−1.4. By limiting the sagittal heights of both surfaces of the sixth lens and the object-side surface of the seventh lens, the shape of the sixth lens and the seventh lens can be effectively controlled, which is beneficial to the processing and molding of the sixth lens and the seventh lens. In addition, it is also beneficial to effectively control the direction of light in the optical imaging system, so that the optical imaging system has good image quality.

In an exemplary embodiment, the optical imaging system according to the present disclosure may satisfy 1.7<T23/T34<3.7, where T23 is a spaced interval between the second lens and the third lens along the optical axis, and T34 is a spaced interval between the third lens and the fourth lens along the optical axis. More specifically, T23 and T34 may satisfy 1.80<T23/T34<3.65. By limiting the air gap between the second lens and the fourth lens, the field curvature of the optical imaging system can be effectively controlled, so that the field curvature is within a small range, and the optical imaging system has a good imaging quality.

In an exemplary embodiment, the above optical imaging system may further include a stop. The stop may be disposed at an appropriate position as required. For example, the stop is disposed between the object side and the first lens. Optionally, the above optical imaging system may further include an optical filter for correcting the color deviation and/or a protective glass for protecting the photosensitive element located on an imaging plane.

The optical imaging system according to the above embodiments of the present disclosure may employ a plurality of lenses, such as seven lenses as described above. By properly configuring the refractive power of each lens, the surface shape, the center thickness of each lens, and spaced intervals along the optical axis between the lenses, the size and the sensitivity of the imaging system may be effectively reduced, and the workability of the imaging system may be improved, such that the optical imaging system is more advantageous for production processing and may be applied to portable electronic products. At the same time, the optical imaging system of the present disclosure also has excellent optical performances, such as large imaging plane, large wide-angle, large aperture and the like.

In the embodiments of the present disclosure, at least one of the surfaces of lenses is aspheric, that is, at least one of the object-side surface of the first lens to the image-side surface of the seventh lens is aspheric. The aspheric lens is characterized by a continuous change in curvature from the center of the lens to the periphery of the lens. Unlike a spherical lens having a constant curvature from the center of the lens to the periphery of the lens, the aspheric lens has a better curvature radius characteristic, and has the advantages of improving distortion aberration and improving astigmatic aberration. With aspheric lens, the aberrations that occur during imaging may be eliminated as much as possible, and thus improving the image quality. Optionally, at least one of the object-side surface and the image-side surface of each of the first lens, the second lens, the third lens, the fourth lens, the fifth lens, the sixth lens and the seventh lens is aspheric. Optionally, the object-side surface and the image-side surface of each of the first lens, the second lens, the third lens, the fourth lens, the fifth lens, the sixth lens and the seventh lens are aspheric.

However, it will be understood by those skilled in the art that the number of lenses constituting the optical imaging system may be varied to achieve the various results and advantages described in this specification without departing from the technical solution claimed by the present disclosure. For example, although the embodiment is described by taking seven lenses as an example, the optical imaging system is not limited to include seven lenses. The optical imaging system may also include other numbers of lenses if desired.

Some specific examples of an optical imaging system applicable to the above embodiment will be further described below with reference to the accompanying drawings.

Example 1

An optical imaging system according to Example 1 of the present disclosure is described below with reference to FIG. 1 to FIG. 2D. FIG. 1 shows a schematic structural view of the optical imaging system according to Example 1 of the present disclosure.

As shown in FIG. 1, the optical imaging system includes a stop STO, a first lens E1, a second lens E2, a third lens E3, a fourth lens E4, a fifth lens E5, a sixth lens E6, a seventh lens E7 and an optical filter E8, which are sequentially arranged from an object side to an image side along an optical axis.

The first lens E1 has positive refractive power, an object-side surface S1 thereof is a convex surface, and an image-side surface S2 thereof is a concave surface. The second lens E2 has negative refractive power, an object-side surface S3 thereof is a convex surface, and an image-side surface S4 thereof is a concave surface. The third lens E3 has positive refractive power, an object-side surface S5 thereof is a convex surface, and an image-side surface S6 thereof is a concave surface. The fourth lens E4 has positive refractive power, an object-side surface S7 thereof is a convex surface, and an image-side surface S8 thereof is a convex surface. The fifth lens E5 has positive refractive power, an object-side surface S9 thereof is a convex surface, an an image-side surface S10 thereof is a concave surface. The sixth lens E6 has positive refractive power, an object-side surface S11 thereof is a convex surface, and an image-side surface S12 thereof is a convex surface. The seventh lens E7 has negative refractive power, an object-side surface S13 thereof is a concave surface, and an image-side surface S14 thereof is a concave surface. The optical filter E8 has an object-side surface S15 and an image-side surface S16. The optical imaging system has an imaging plane S17, and light from an object sequentially passes through the respective surfaces S1 to S16 and is finally imaged on the imaging plane S17.

Table 1 is a table illustrating basic parameters of the optical imaging system of Example 1, wherein the units for the radius of curvature, the thickness/distance and the focal length are millimeter (mm).

TABLE 1

| | | | | Material | | | |
|---|---|---|---|---|---|---|---|
| Surface number | Surface type | Radius of curvature | Thickness/ Distance | Refractive index | Abbe number | Focal length | Conic coefficient |
| OBJ | Spherical | Infinite | Infinite | | | | |
| STO | Spherical | Infinite | −0.8238 | | | | |
| S1 | Aspheric | 2.3773 | 1.0000 | 1.55 | 56.1 | 6.58 | −0.0399 |
| S2 | Aspheric | 5.9879 | 0.0706 | | | | −18.8854 |
| S3 | Aspheric | 8.4322 | 0.3000 | 1.68 | 19.2 | −36.38 | −18.5543 |
| S4 | Aspheric | 6.1929 | 0.3698 | | | | −0.6006 |
| S5 | Aspheric | 14.4810 | 0.3000 | 1.68 | 19.2 | 169.56 | 69.7503 |
| S6 | Aspheric | 16.4307 | 0.2001 | | | | 98.9972 |
| S7 | Aspheric | 25.0184 | 0.4295 | 1.55 | 56.1 | 34.95 | 99.0000 |
| S8 | Aspheric | −79.9173 | 0.6000 | | | | −99.0000 |
| S9 | Aspheric | 31.4558 | 0.5100 | 1.57 | 37.3 | 552.86 | −15.8331 |
| S10 | Aspheric | 34.7354 | 0.4405 | | | | 40.6615 |
| S11 | Aspheric | 6.2312 | 0.6100 | 1.55 | 56.1 | 10.00 | −6.0570 |
| S12 | Aspheric | −42.4187 | 0.9128 | | | | −99.0000 |
| S13 | Aspheric | −2.3722 | 0.5500 | 1.54 | 55.7 | −3.85 | −3.4418 |
| S14 | Aspheric | 17.5578 | 0.1950 | | | | 11.0359 |
| S15 | Spherical | Infinite | 0.2100 | 1.51 | 64.2 | | |
| S16 | Spherical | Infinite | 0.3817 | | | | |
| S17 | Spherical | Infinite | | | | | |

In Example 1, a total effective focal length f of the optical imaging system is 6.30 mm, a distance TTL along the optical axis from the object-side surface S1 of the first lens E1 to the imaging plane S17 is 7.08 mm, half of a diagonal length ImgH of an effective pixel area on the imaging plane S17 is 6.13 mm, and half of a maximal field-of-view Semi-FOV is 43.92°.

In Example 1, the object-side surface and the image-side surface of any one of the first lens E1 to the seventh lens E7 are aspheric. The surface shape x of each aspheric lens may be defined by using, but not limited to, the following aspheric formula:

$$x = \frac{ch^2}{1 + \sqrt{1 - (k+1)c^2h^2}} + \sum Aih^i \tag{1}$$

Where, x is the sag—the axis-component of the displacement of the surface from the aspheric vertex, when the surface is at height h from the optical axis; c is a paraxial curvature of the aspheric surface, c=1/R(that is, the paraxial curvature c is reciprocal of the radius of curvature Rin the above Table 1); k is a conic coefficient; Ai is a correction coefficient for the i-th order of the aspheric surface. Table 2 below shows high-order coefficients A4, A6, A8, A10, A12, A14, A16, A18 and A20 applicable to each aspheric surface S1 to S14 in Example 10.

TABLE 2

| Surface number | A4 | A6 | A8 | A10 | A12 |
|---|---|---|---|---|---|
| S1 | −3.0220E−03 | 9.2235E−03 | −1.5861E−02 | 1.6849E−02 | −1.1336E−02 |
| S2 | 1.9294E−05 | −3.4576E−03 | 5.5306E−03 | −1.1064E−02 | 1.2067E−02 |
| S3 | −1.9503E−03 | −4.8855E−03 | 2.0768E−02 | −3.4014E−02 | 3.2583E−02 |
| S4 | 2.6101E−03 | 2.7470E−02 | −7.4948E−02 | 1.3224E−01 | −1.4146E−01 |
| S5 | −2.3450E−02 | 4.2966E−02 | −1.2540E−01 | 2.0500E−01 | −2.0705E−01 |
| S6 | −2.0464E−02 | −3.6617E−03 | 2.5038E−02 | −5.2539E−02 | 5.7373E−02 |
| S7 | −2.7628E−02 | 2.5506E−03 | −2.5543E−03 | −1.1467E−03 | 4.0330E−03 |
| S8 | −2.3046E−02 | −2.5849E−03 | 9.2377E−03 | −2.0138E−02 | 2.1195E−02 |
| S9 | −1.6070E−02 | −2.0231E−02 | 4.2030E−02 | −5.0519E−02 | 3.6087E−02 |
| S10 | −3.4359E−02 | 8.1982E−03 | −5.0607E−03 | 3.2013E−03 | −1.3997E−03 |
| S11 | −9.9872E−03 | −9.3831E−03 | 1.5113E−03 | 1.4595E−04 | −9.9888E−05 |
| S12 | 1.8807E−02 | −1.3402E−02 | 1.8420E−03 | 2.0180E−04 | −9.0305E−05 |
| S13 | −1.1954E−02 | −7.0092E−03 | 3.9827E−03 | −7.9494E−04 | 8.7294E−05 |
| S14 | −9.3676E−03 | 4.3961E−03 | 1.8465E−03 | −3.3119E−04 | 3.3940E−05 |

| Surface number | A14 | A16 | A18 | A20 |
|---|---|---|---|---|
| S1 | 4.8219E−03 | −1.2566E−03 | 1.8157E−04 | −1.1159E−05 |
| S2 | −7.4599E−03 | 2.6693E−03 | −5.0784E−04 | 3.9251E−05 |
| S3 | −1.8605E−02 | 6.2800E−03 | −1.1389E−03 | 8.4773E−05 |
| S4 | 9.3432E−02 | −3.7244E−02 | 8.2424E−03 | −7.7661E−04 |
| S5 | 1.2958E−01 | −4.8909E−02 | 1.0230E−02 | −9.1406E−04 |
| S6 | −3.6232E−02 | 1.3364E−02 | −2.6184E−03 | 2.0574E−04 |
| S7 | −3.4962E−03 | 1.5334E−03 | −3.1522E−04 | 2.3759E−05 |
| S8 | −1.2993E−02 | 4.7069E−03 | −9.3637E−04 | 7.9469E−05 |
| S9 | −1.6073E−02 | 4.3290E−03 | −6.4445E−04 | 4.0605E−05 |
| S10 | 3.5460E−04 | −4.9198E−05 | 3.4896E−06 | −9.9466E−08 |
| S11 | 2.0313E−05 | −2.1440E−06 | 1.1528E−07 | −2.4916E−09 |
| S12 | 1.1709E−05 | −7.5907E−07 | 2.4588E−08 | −3.0839E−10 |
| S13 | −5.8046E−06 | 2.3385E−07 | −5.2718E−09 | 5.1150E−11 |
| S14 | −2.1330E−06 | 8.1703E−08 | −1.7523E−09 | 1.6104E−11 |

Figure 2A:
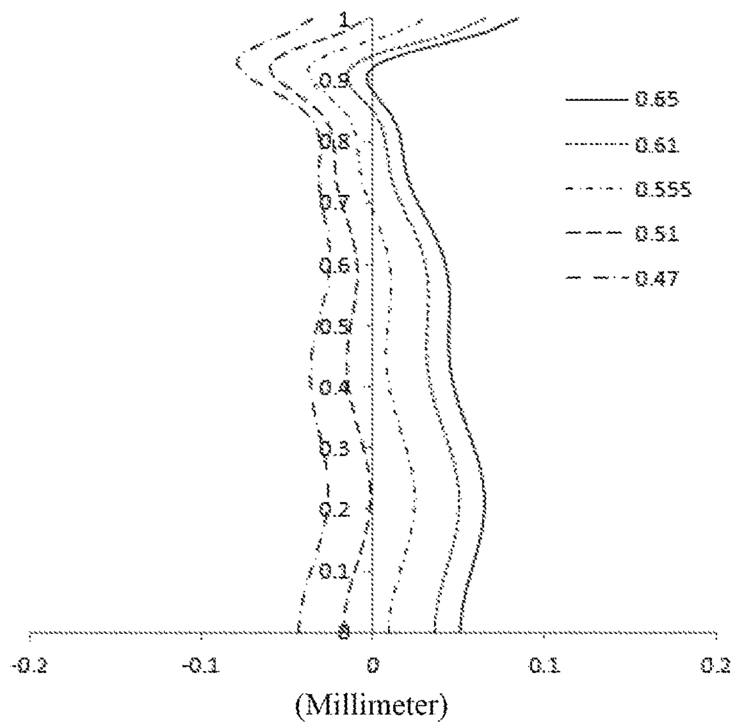
FIGS. 2A to 2D illustrate a longitudinal aberration curve, an astigmatic curve, a distortion curve, and a lateral color curve of the optical imaging lens assembly of the Example 1, respectively.
Figure 2B:
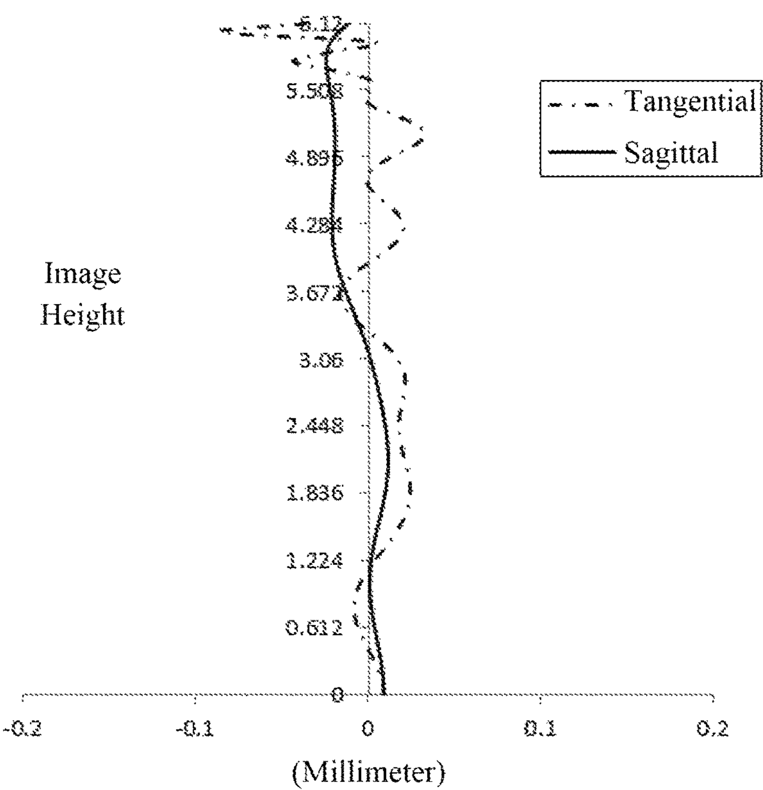
Figure 2C:
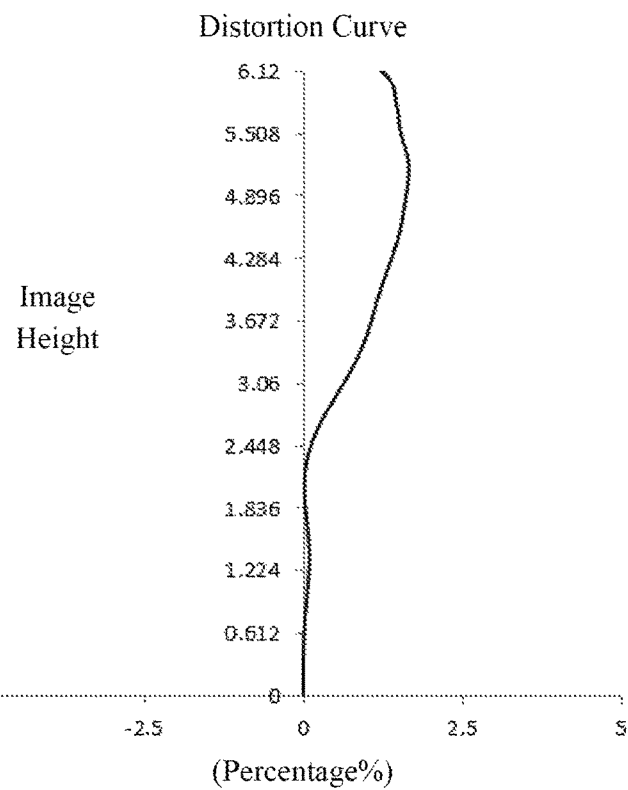
Figure 2D:
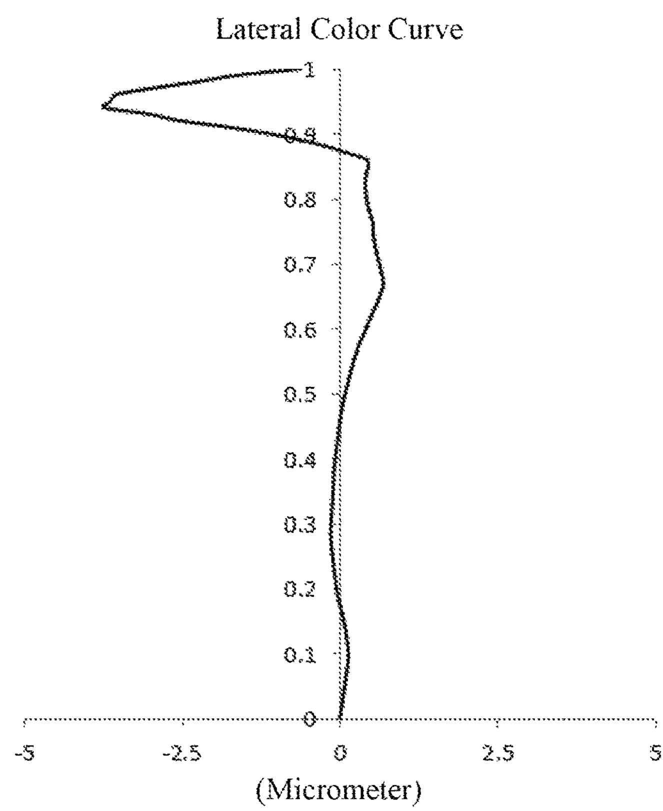

FIG. 2A illustrates a longitudinal aberration curve of the optical imaging system according to Example 1, representing deviations of focal points converged by light of different wavelengths after passing through the system. FIG. 2B illustrates an astigmatic curve of the optical imaging system according to Example 1, representing a curvature of a tangential plane and a curvature of a sagittal plane. FIG. 2C illustrates a distortion curve of the optical imaging system according to Example 1, representing amounts of distortion corresponding to different image heights. FIG. 2D illustrates a lateral color curve of the optical imaging system according to Example 1, representing deviations of different image heights on an imaging plane after light passes through the system. It can be seen from FIG. 2A to FIG. 2D that the optical imaging system provided in Example 1 may achieve good image quality.

Example 2

Figure 3:
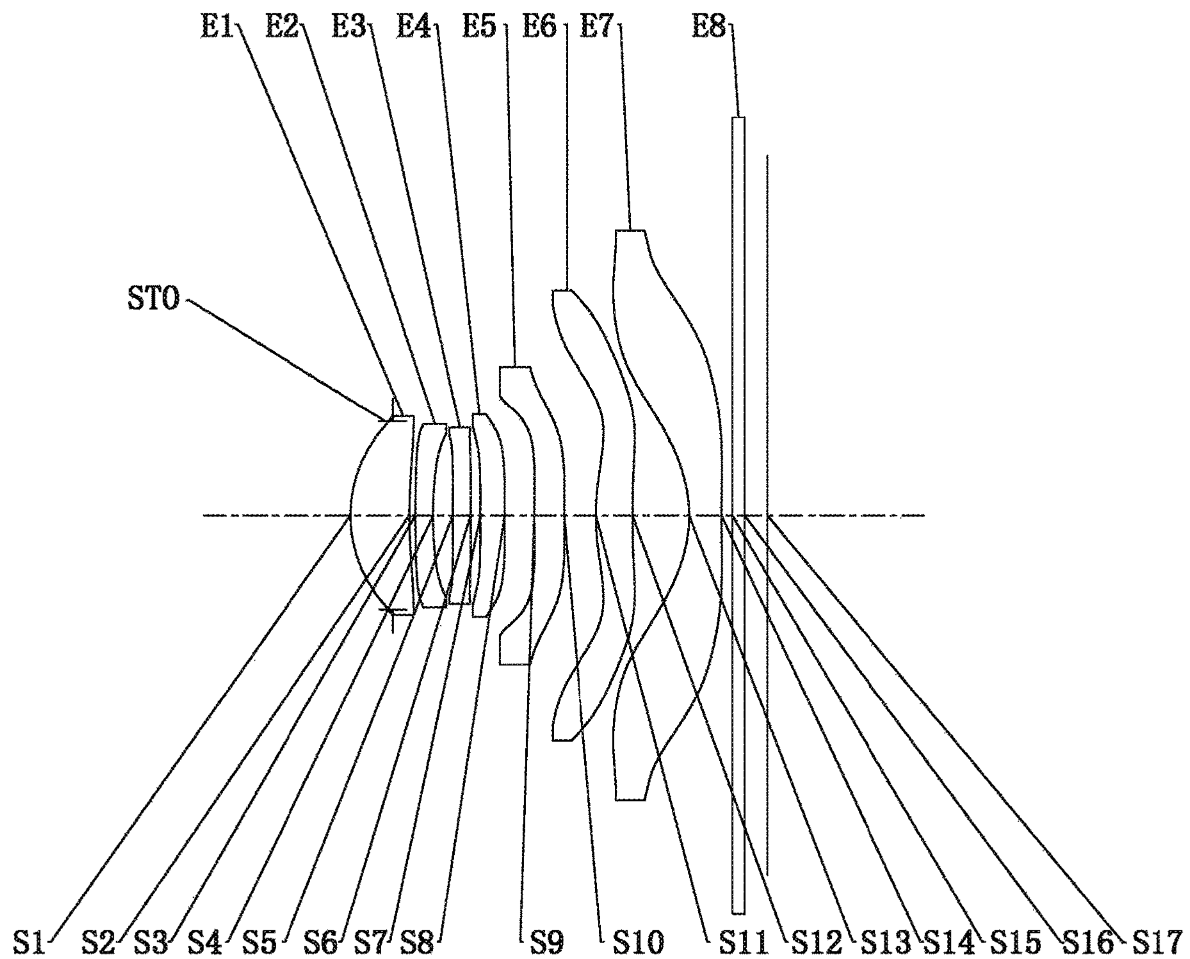
FIG. 3 illustrates a schematic structural view of an optical imaging lens assembly according to Example 2 of the present disclosure.

An optical imaging system according to Example 2 of the present disclosure is described below with reference to FIG. 3 to FIG. 4D. In this example and the following examples, for the purpose of brevity, the description of parts similar to those in Example 1 will be omitted. FIG. 3 shows a schematic structural view of the optical imaging system according to Example 2 of the present disclosure.

As shown in FIG. 3, the optical imaging system includes a stop STO, a first lens E1, a second lens E2, a third lens E3, a fourth lens E4, a fifth lens E5, a sixth lens E6, a seventh lens E7 and an optical filter E8, which are sequentially arranged from an object side to an image side along an optical axis.

The first lens E1 has positive refractive power, an object-side surface S1 thereof is a convex surface, and an image-side surface S2 thereof is a concave surface. The second lens E2 has negative refractive power, an object-side surface S3 thereof is a convex surface, and an image-side surface S4 thereof is a concave surface. The third lens E3 has negative refractive power, an object-side surface S5 thereof is a convex surface, and an image-side surface S6 thereof is a concave surface. The fourth lens E4 has positive refractive power, an object-side surface S7 thereof is a convex surface, and an image-side surface S8 thereof is a concave surface. The fifth lens E5 has positive refractive power, an object-side surface S9 thereof is a convex surface, and an image-side surface S10 thereof is a concave surface. The sixth lens E6 has positive refractive power, an object-side surface S11 thereof is a convex surface, and an image-side surface S12 thereof is a concave surface. The seventh lens E7 has negative refractive power, an object-side surface S13 thereof is a concave surface, and an image-side surface S14 thereof is a concave surface. The optical filter E8 has an object-side surface S15 and an image-side surface S16. The optical imaging system has an imaging plane S17, and light from an object sequentially passes through the respective surfaces S1 to S16 and is finally imaged on the imaging plane S17.

In Example 2, a total effective focal length f of the optical imaging system is 6.30 mm, a distance TTL along the optical axis from the object-side surface S1 of the first lens E1 to the imaging plane S17 is 7.08 mm, half of a diagonal length ImgH of an effective pixel area on the imaging plane S17 is 6.12 mm, and half of a maximal field-of-view Semi-FOV is 43.93°.

Table 3 is a table illustrating basic parameters of the optical imaging system of Example 2, wherein the units for the radius of curvature, the thickness/distance and the focal length are millimeter (mm). Table 4 shows high-order coefficients applicable to each aspheric surface in Example 2, wherein the surface shape of each aspheric surface may be defined by the formula (1) given in the above Example 1.

TABLE 3

| Surface number | Surface type | Radius of curvature | Thickness/ Distance | Material: Refractive index | Material: Abbe number | Focal length | Conic coefficient |
|---|---|---|---|---|---|---|---|
| OBJ | Spherical | Infinite | Infinite | | | | |
| STO | Spherical | Infinite | −0.7202 | | | | |
| S1 | Aspheric | 2.2644 | 0.9974 | 1.55 | 56.1 | 5.47 | −0.0713 |
| S2 | Aspheric | 7.9190 | 0.1029 | | | | −40.2214 |
| S3 | Aspheric | 16.6771 | 0.3000 | 1.68 | 19.2 | −17.20 | 6.7515 |
| S4 | Aspheric | 6.8115 | 0.3366 | | | | 4.1265 |
| S5 | Aspheric | 31.8409 | 0.3000 | 1.68 | 19.2 | −1820.86 | 91.8371 |
| S6 | Aspheric | 30.9217 | 0.1666 | | | | 83.6107 |
| S7 | Aspheric | 36.7407 | 0.4118 | 1.55 | 56.1 | 227.69 | 57.7377 |
| S8 | Aspheric | 51.9500 | 0.5017 | | | | −22.8091 |
| S9 | Aspheric | 16.5210 | 0.5100 | 1.57 | 37.3 | 93.24 | 12.6813 |
| S10 | Aspheric | 23.6966 | 0.5463 | | | | 18.1611 |
| S11 | Aspheric | 4.1831 | 0.6194 | 1.55 | 56.1 | 9.14 | 0.0000 |
| S12 | Aspheric | 24.4914 | 0.9604 | | | | 18.5482 |
| S13 | Aspheric | −2.4263 | 0.5500 | 1.54 | 55.7 | −4.09 | −4.0471 |
| S14 | Aspheric | 25.0455 | 0.1827 | | | | 22.8276 |
| S15 | Spherical | Infinite | 0.2100 | 1.51 | 64.2 | | |
| S16 | Spherical | Infinite | 0.3842 | | | | |
| S17 | Spherical | Infinite | | | | | |

TABLE 4

| Surface number | A4 | A6 | A8 | A10 | A12 |
|---|---|---|---|---|---|
| S1 | 8.2006E−04 | −2.0738E−05 | 1.9672E−03 | −4.2530E−03 | 4.8377E−03 |
| S2 | −1.5644E−02 | 1.0582E−02 | −7.0086E−03 | 6.2476E−03 | −4.3483E−03 |
| S3 | −2.4857E−02 | 1.2683E−02 | 3.6654E−02 | −7.5837E−02 | 7.8766E−02 |
| S4 | −9.0544E−03 | 3.3768E−02 | −4.4317E−02 | 7.3611E−02 | −8.7428E−02 |
| S5 | −2.8057E−02 | 3.1932E−02 | −8.3535E−02 | 1.5035E−01 | −1.8166E−01 |
| S6 | −2.9457E−02 | 2.1365E−02 | −1.1170E−02 | −1.6190E−02 | 3.7709E−02 |
| S7 | −4.1723E−02 | 1.1249E−02 | 3.9976E−03 | −1.7412E−02 | 1.2957E−02 |
| S8 | −4.1540E−02 | 2.0595E−02 | −2.9013E−02 | 2.8862E−02 | −2.0619E−02 |
| S9 | −4.4464E−02 | 1.8688E−02 | −2.6220E−02 | 2.9995E−02 | −2.3015E−02 |
| S10 | −5.2786E−02 | 1.1465E−02 | −4.0799E−03 | 2.6787E−03 | −1.5117E−03 |
| S11 | −1.7424E−02 | −9.8455E−03 | 2.2951E−03 | −2.8369E−04 | 3.7258E−05 |
| S12 | 2.2559E−02 | −1.8026E−02 | 3.8497E−03 | −3.5599E−04 | 3.9063E−06 |
| S13 | −1.7698E−02 | −5.5431E−04 | 1.4313E−03 | −2.9108E−04 | 2.9640E−05 |
| S14 | −1.5074E−02 | 2.8283E−04 | 5.271E−04 | −1.2183E−04 | 1.3088E−05 |

| Surface number | A14 | A16 | A18 | A20 |
|---|---|---|---|---|
| S1 | −3.2568E−03 | 1.2750E−03 | −2.7125E−04 | 2.3701E−05 |
| S2 | 1.4499E−03 | −1.0619E−04 | −5.3389E−05 | 1.0053E−05 |
| S3 | −4.9779E−02 | 1.9118E−02 | −4.0755E−03 | 3.7102E−04 |
| S4 | 6.4838E−02 | −2.8717E−02 | 7.0237E−03 | −7.2852E−04 |
| S5 | 1.4070E−01 | −6.7115E−02 | 1.8006E−02 | −2.0856E−03 |
| S6 | −3.3681E−02 | 1.5974E−02 | −3.8753E−03 | 3.7877E−04 |
| S7 | −1.9333E−03 | −2.3809E−03 | 1.2881E−03 | −1.8904E−04 |
| S8 | 9.2395E−03 | −2.3962E−03 | 3.0193E−04 | −9.9421E−06 |
| S9 | 1.0685E−02 | −2.9237E−03 | 4.3153E−04 | −2.6210E−05 |
| S10 | 4.9100E−04 | −8.5227E−05 | 7.4507E−06 | −2.5915E−07 |
| S11 | −4.4971E−06 | 3.3894E−07 | −1.3407E−08 | 2.1464E−10 |
| S12 | 2.2650E−06 | −2.1660E−07 | 8.4984E−09 | −1.2712E−10 |
| S13 | −1.7819E−06 | 6.4324E−08 | −1.2950E−09 | 1.1206E−11 |
| S14 | −8.0006E−07 | 2.8736E−08 | −5.6727E−10 | 4.7558E−12 |

Figure 4A:
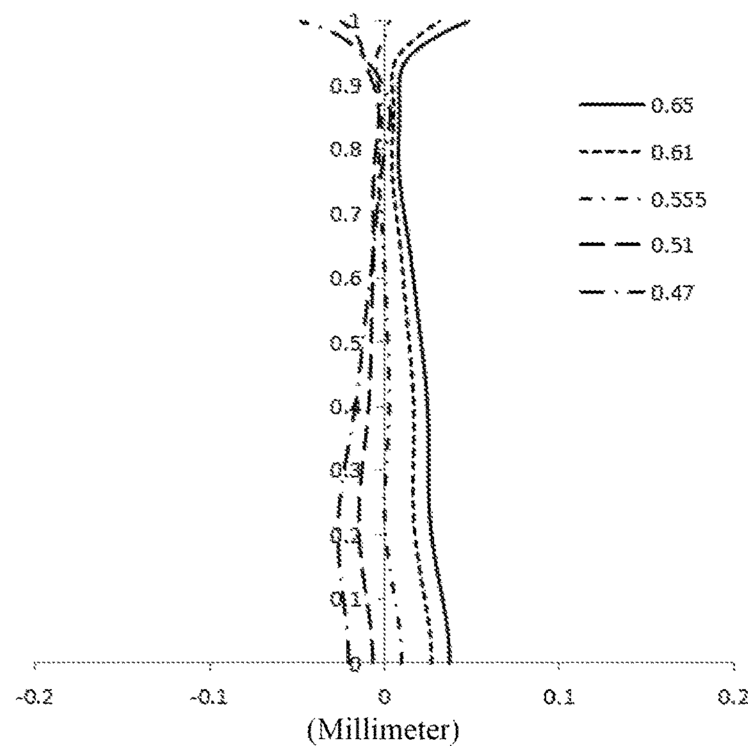
FIGS. 4A to 4D illustrate a longitudinal aberration curve, an astigmatic curve, a distortion curve, and a lateral color curve of the optical imaging lens assembly of the Example 2, respectively.
Figure 4B:
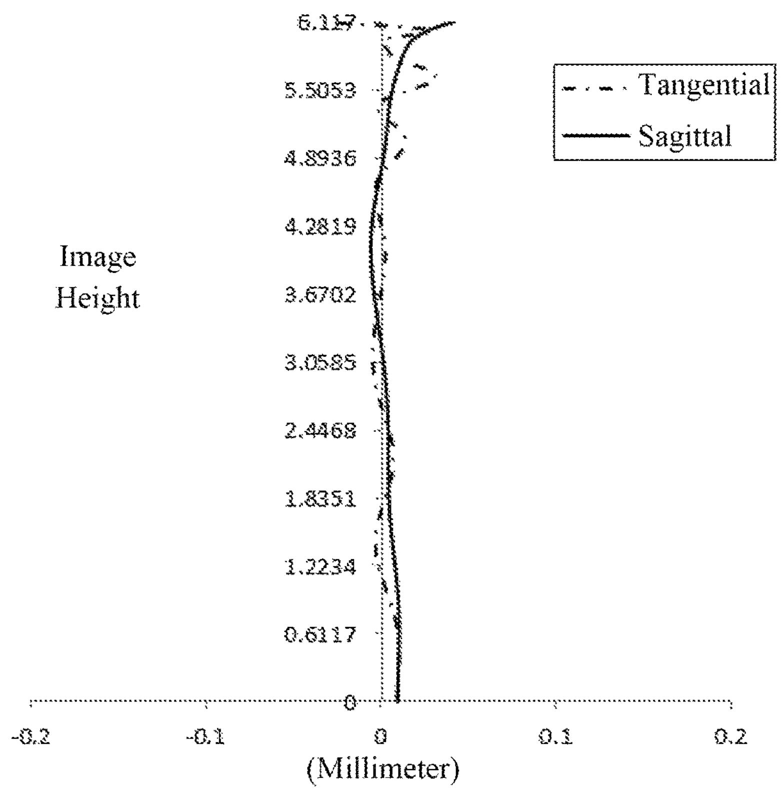
Figures 4C, 4D:
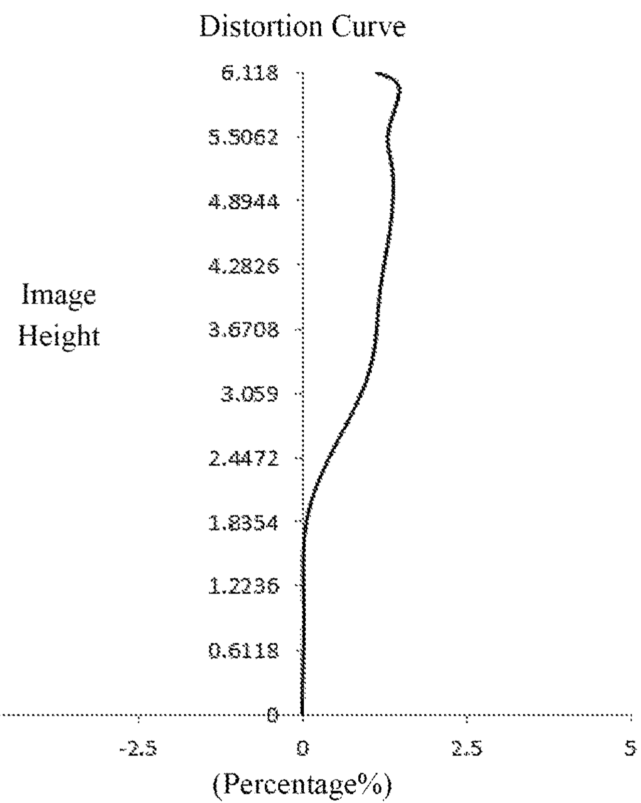

FIG. 4A illustrates a longitudinal aberration curve of the optical imaging system according to Example 2, representing deviations of focal points converged by light of different wavelengths after passing through the system. FIG. 4B illustrates an astigmatic curve of the optical imaging system according to Example 2, representing a curvature of a tangential plane and a curvature of a sagittal plane. FIG. 4C illustrates a distortion curve of the optical imaging system according to Example 2, representing amounts of distortion corresponding to different image heights. FIG. 4D illustrates a lateral color curve of the optical imaging system according to Example 2, representing deviations of different image heights on an imaging plane after light passes through the system. It can be seen from FIG. 4A to FIG. 4D that the optical imaging system provided in Example 2 may achieve good image quality.

Example 3

Figure 5:
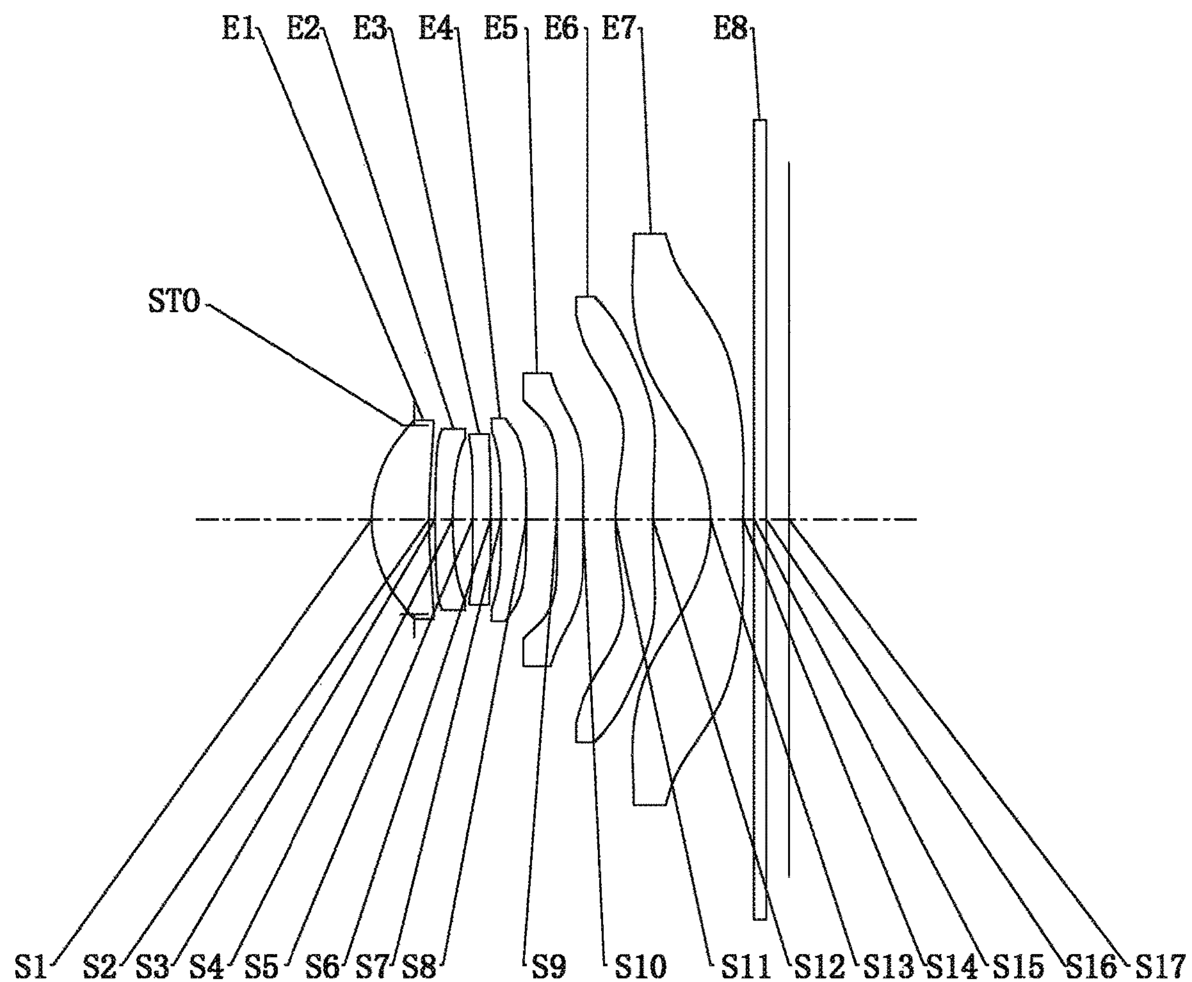
FIG. 5 illustrates a schematic structural view of an optical imaging lens assembly according to Example 3 of the present disclosure.

An optical imaging system according to Example 3 of the present disclosure is described below with reference to FIG. 5 to FIG. 6D. FIG. 5 shows a schematic structural view of the optical imaging system according to Example 3 of the present disclosure.

As shown in FIG. 5, the optical imaging system includes a stop STO, a first lens E1, a second lens E2, a third lens E3, a fourth lens E4, a fifth lens E5, a sixth lens E6, a seventh lens E7 and an optical filter E8, which are sequentially arranged from an object side to an image side along an optical axis.

The first lens E1 has positive refractive power, an object-side surface S1 thereof is a convex surface, and an image-side surface S2 thereof is a concave surface. The second lens E2 has negative refractive power, an object-side surface S3 thereof is a convex surface, and an image-side surface S4 thereof is a concave surface. The third lens E3 has positive refractive power, an object-side surface S5 thereof is a convex surface, and an image-side surface S6 thereof is a concave surface. The fourth lens E4 has positive refractive power, an object-side surface S7 thereof is a concave surface, and an image-side surface S8 thereof is a convex surface. The fifth lens E5 has positive refractive power, an object-side surface S9 thereof is a convex surface, and an image-side surface S10 thereof is a concave surface. The sixth lens E6 has positive refractive power, an object-side surface S11 thereof is a convex surface, and an image-side surface S12 thereof is a concave surface. The seventh lens E7 has negative refractive power, an object-side surface S13 thereof is a concave surface, and an image-side surface S14 thereof is a concave surface. The optical filter E8 has an object-side surface S15 and an image-side surface S16. The optical imaging system has an imaging plane S17, and light from an object sequentially passes through the respective surfaces S1 to S16 and is finally imaged on the imaging plane S17.

In Example 3, a total effective focal length f of the optical imaging system is 6.20 mm, a distance TTL along the optical axis from the object-side surface S1 of the first lens E1 to the imaging plane S17 is 7.08 mm, half of a diagonal length ImgH of an effective pixel area on the imaging plane S17 is 6.05 mm, and half of a maximal field-of-view Semi-FOV is 43.97°.

Table 5 is a table illustrating basic parameters of the optical imaging system of Example 3, wherein the units for the radius of curvature, the thickness/distance and the focal length are millimeter (mm). Table 6 shows high-order coefficients applicable to each aspheric surface in Example 3, wherein the surface shape of each aspheric surface may be defined by the formula (1) given in the above Example 1.

TABLE 5

| | | | | Material | | | |
|---|---|---|---|---|---|---|---|
| Surface number | Surface type | Radius of curvature | Thickness/ Distance | Refractive index | Abbe number | Focal length | Conic coefficient |
| OBJ | Spherical | Infinite | Infinite | | | | |
| STO | Spherical | Infinite | −0.7079 | | | | |
| S1 | Aspheric | 2.2689 | 0.9698 | 1.55 | 56.1 | 5.41 | −0.0559 |
| S2 | Aspheric | 8.3150 | 0.1047 | | | | −37.3208 |
| S3 | Aspheric | 17.7444 | 0.3000 | 1.68 | 19.2 | −16.22 | 12.6204 |
| S4 | Aspheric | 6.7415 | 0.3399 | | | | 3.7451 |
| S5 | Aspheric | 45.2481 | 0.3036 | 1.68 | 19.2 | 389.13 | −99.0000 |
| S6 | Aspheric | 54.4737 | 0.1757 | | | | 99.0000 |
| S7 | Aspheric | −334.0122 | 0.4286 | 1.55 | 56.1 | 220.81 | 99.0000 |
| S8 | Aspheric | −88.6212 | 0.5126 | | | | 98.3081 |
| S9 | Aspheric | 14.2872 | 0.4595 | 1.57 | 37.3 | 146.03 | −6.5506 |
| S10 | Aspheric | 17.0439 | 0.5461 | | | | −10.7716 |
| S11 | Aspheric | 4.0770 | 0.6362 | 1.55 | 56.1 | 8.59 | 0.0000 |
| S12 | Aspheric | 29.5605 | 0.9761 | | | | 7.0056 |
| S13 | Aspheric | −2.4262 | 0.5500 | 1.54 | 55.7 | −4.09 | −3.9166 |
| S14 | Aspheric | 25.0652 | 0.1816 | | | | 22.3942 |
| S15 | Spherical | Infinite | 0.2100 | 1.51 | 64.2 | | |
| S16 | Spherical | Infinite | 0.3855 | | | | |
| S17 | Spherical | Infinite | | | | | |

TABLE 6

| Surface number | A4 | A6 | A8 | A10 | A12 |
|---|---|---|---|---|---|
| S1 | 2.4803E−04 | 2.4868E−03 | −2.7675E−03 | 1.1859E−03 | 9.4601E−04 |
| S2 | −1.5657E−02 | 2.9553E−03 | 1.9793E−02 | −3.6378E−02 | 3.5386E−02 |
| S3 | −2.7082E−02 | 2.2654E−02 | 1.6665E−02 | −4.9375E−02 | 5.5867E−02 |
| S4 | −6.8023E−03 | 1.4140E−02 | 2.9775E−02 | −7.9223E−02 | 1.0198E−01 |
| S5 | −2.6816E−02 | 1.8289E−02 | −3.6925E−02 | 5.4293E−02 | −5.7524E−02 |
| S6 | −2.7069E−02 | 2.0461E−02 | −2.6850E−02 | 2.9206E−02 | −2.4464E−02 |
| S7 | −3.9979E−02 | 2.8053E−02 | −5.7135E−02 | 8.7748E−02 | −9.5119E−02 |
| S8 | −3.7726E−02 | 1.5259E−02 | −2.1073E−02 | 1.7938E−02 | −1.0532E−02 |
| S9 | −4.3249E−02 | 9.4301E−03 | −7.8827E−03 | 9.9242E−03 | −9.4306E−03 |
| S10 | −5.4455E−02 | 8.3053E−03 | 7.0647E−04 | −5.2316E−04 | −3.3214E−04 |
| S11 | −1.6773E−02 | −1.1139E−02 | 3.6547E−03 | −8.0274E−04 | 1.3730E−04 |
| S12 | 2.3217E−02 | −1.8774E−02 | 4.6076E−03 | −6.2546E−04 | 5.2143E−05 |
| S13 | −1.6928E−02 | −1.0243E−03 | 1.5531E−03 | −3.0963E−04 | 3.1445E−05 |
| S14 | −1.4919E−02 | 8.6208E−04 | 3.5488E−04 | −9.8980E−05 | 1.1536E−05 |

TABLE 6-continued

| Surface number | A14 | A16 | A18 | A20 |
|---|---|---|---|---|
| S1 | −1.4742E−03 | 7.6633E−04 | −1.8836E−04 | 1.7736E−05 |
| S2 | −2.1347E−02 | 7.8044E−03 | −1.5764E−03 | 1.3494E−04 |
| S3 | −3.7401E−02 | 1.5141E−02 | −3.3911E−03 | 3.2365E−04 |
| S4 | −8.1079E−02 | 3.9833E−02 | −1.0995E−02 | 1.3089E−03 |
| S5 | 4.0041E−02 | −1.7507E−02 | 4.4334E−03 | −5.0172E−04 |
| S6 | 1.5166E−02 | −6.4751E−03 | 1.7470E−03 | −2.1370E−04 |
| S7 | 6.7183E−02 | −2.9359E−02 | 7.1657E−03 | −7.3481E−04 |
| S8 | 3.4767E−03 | −4.3461E−04 | −6.2905E−05 | 1.8447E−05 |
| S9 | 4.9140E−03 | −1.4275E−03 | 2.1712E−04 | −1.3336E−05 |
| S10 | 2.3848E−04 | −5.3851E−05 | 5.3466E−06 | −2.0007E−07 |
| S11 | −1.5471E−05 | 1.0371E−06 | −3.7495E−08 | 5.6421E−10 |
| S12 | −2.6471E−06 | 7.3457E−08 | −7.7491E−10 | −2.8457E−12 |
| S13 | −1.8961E−06 | 6.8874E−08 | −1.3982E−09 | 1.2222E−11 |
| S14 | −7.5125E−07 | 2.8548E−08 | −5.9258E−10 | 5.1890E−12 |

Figure 6A:
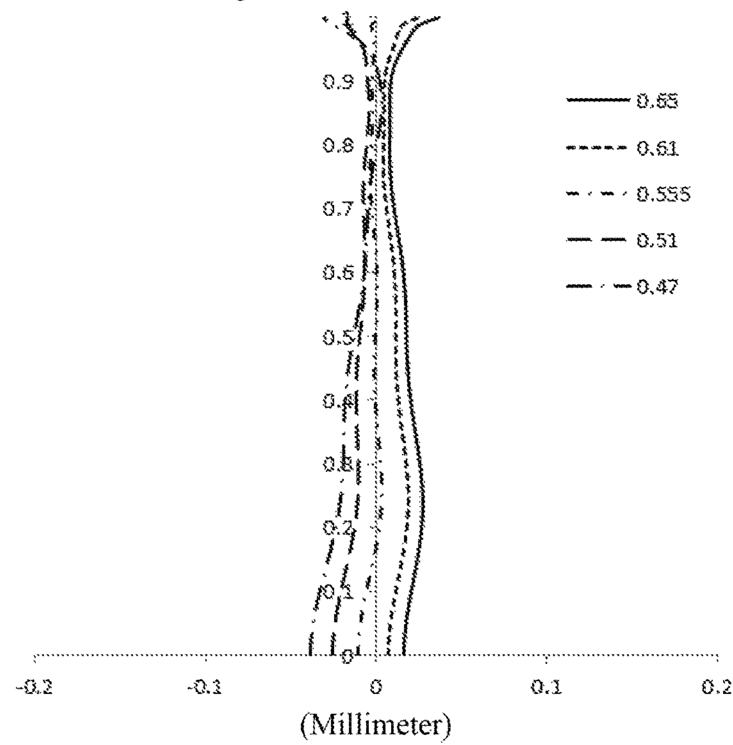
FIGS. 6A to 6D illustrate a longitudinal aberration curve, an astigmatic curve, a distortion curve, and a lateral color curve of the optical imaging lens assembly of the Example 3, respectively.
Figure 6B:
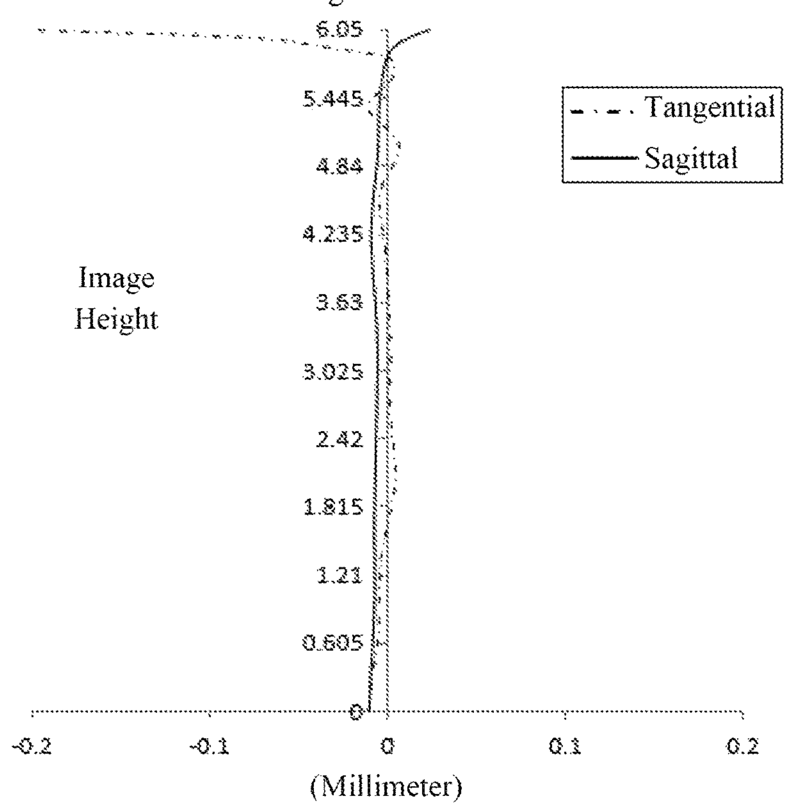
Figure 6C:
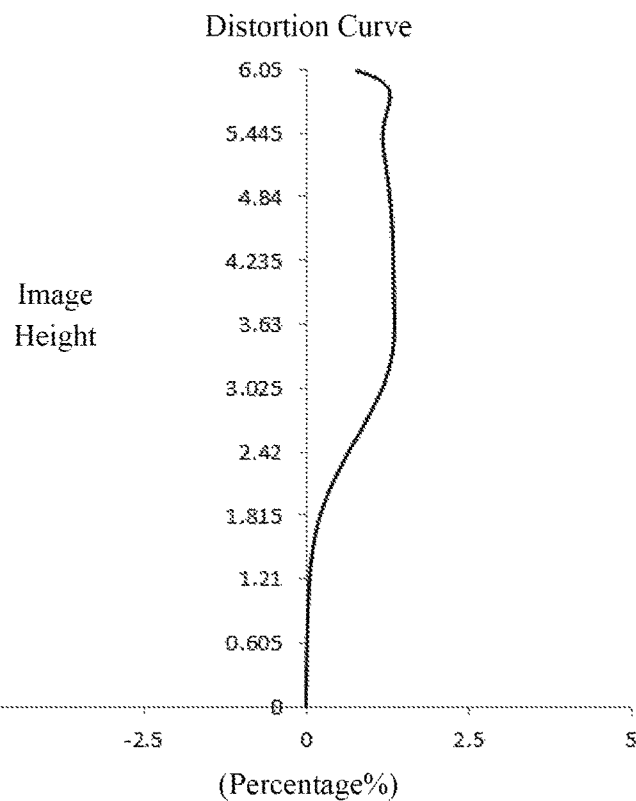
Figure 6D:
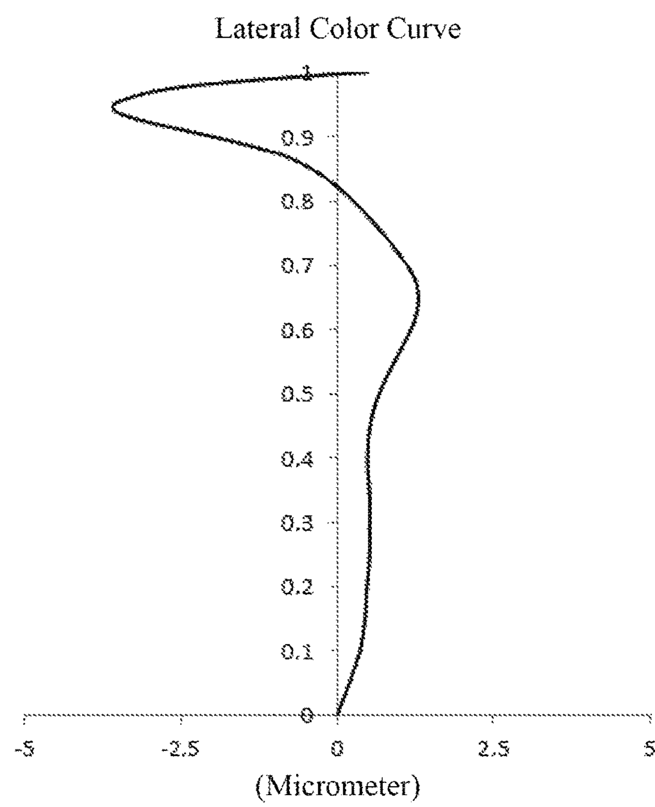

FIG. 6A illustrates a longitudinal aberration curve of the optical imaging system according to Example 3, representing deviations of focal points converged by light of different wavelengths after passing through the system. FIG. 6B illustrates an astigmatic curve of the optical imaging system according to Example 3, representing a curvature of a tangential plane and a curvature of a sagittal plane. FIG. 6C illustrates a distortion curve of the optical imaging system according to Example 3, representing amounts of distortion corresponding to different image heights. FIG. 6D illustrates a lateral color curve of the optical imaging system according to Example 3, representing deviations of different image heights on an imaging plane after light passes through the system. It can be seen from FIG. 6A to FIG. 6D that the optical imaging system provided in Example 3 may achieve good image quality.

Example 4

Figure 7:
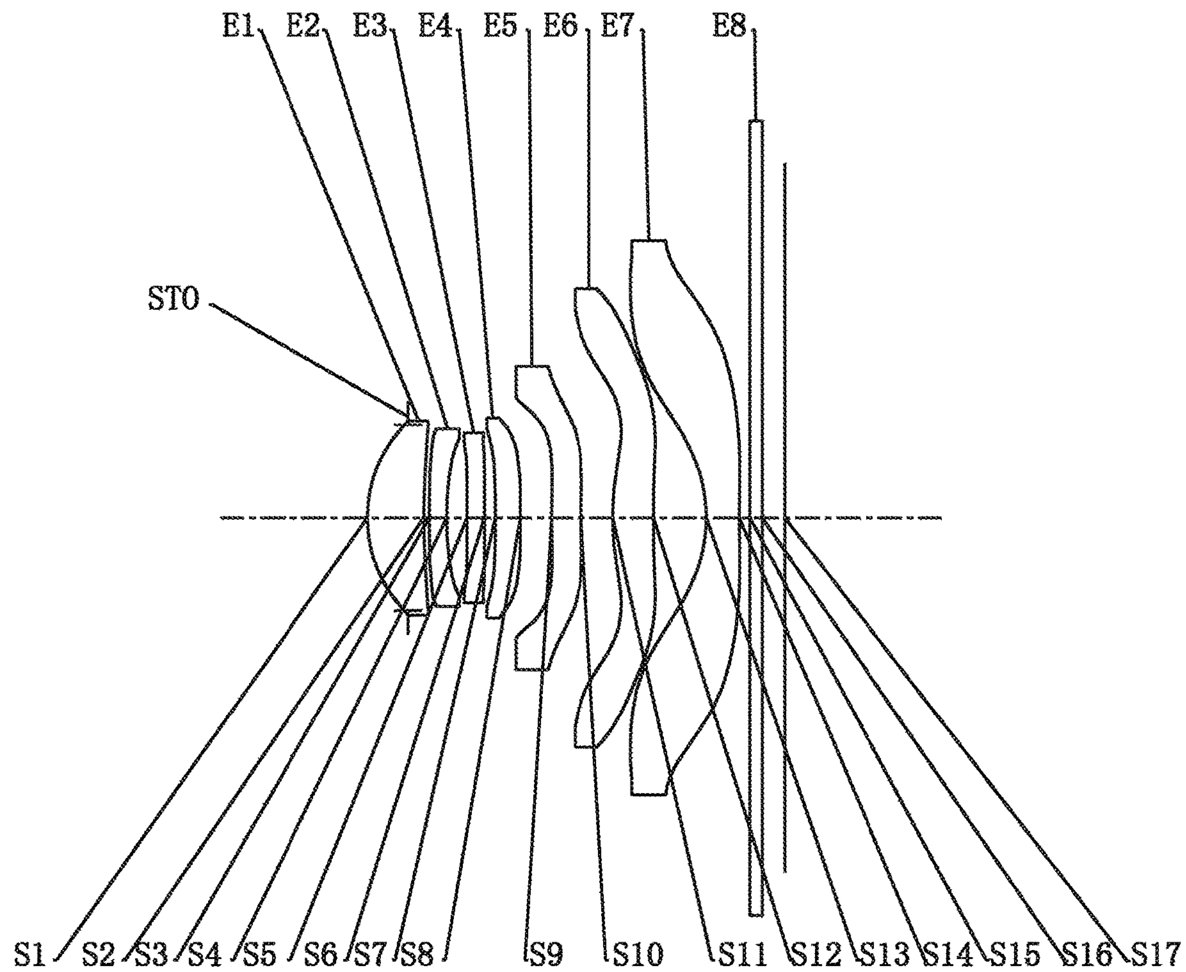
FIG. 7 illustrates a schematic structural view of an optical imaging lens assembly according to Example 4 of the present disclosure.

An optical imaging system according to Example 4 of the present disclosure is described below with reference to FIG. 7 to FIG. 8D. FIG. 7 shows a schematic structural view of the optical imaging system according to Example 4 of the present disclosure.

As shown in FIG. 7, the optical imaging system includes a stop STO, a first lens E1, a second lens E2, a third lens E3, a fourth lens E4, a fifth lens E5, a sixth lens E6, a seventh lens E7 and an optical filter E8, which are sequentially arranged from an object side to an image side along an optical axis.

The first lens E1 has positive refractive power, an object-side surface S1 thereof is a convex surface, and an image-side surface S2 thereof is a concave surface. The second lens E2 has negative refractive power, an object-side surface S3 thereof is a convex surface, and an image-side surface S4 thereof is a concave surface. The third lens E3 has positive refractive power, an object-side surface S5 thereof is a convex surface, and an image-side surface S6 thereof is a concave surface. The fourth lens E4 has positive refractive power, an object-side surface S7 thereof is a convex surface, and an image-side surface S8 thereof is a convex surface. The fifth lens E5 has negative refractive power, an5 object-side surface S9 thereof is a convex surface, and an image-side surface S10 thereof is a concave surface. The sixth lens E6 has positive refractive power, an object-side surface S11 thereof is a convex surface, and an image-side surface S12 thereof is a concave surface. The seventh lens E7 has negative refractive power, an object-side surface S13 thereof is a concave surface, and an image-side surface S14 thereof is a concave surface. The optical filter E8 has an object-side surface S15 and an image-side surface S16. The optical imaging system has an imaging plane S17, and light from an object sequentially passes through the respective surfaces S1 to S16 and is finally imaged on the imaging plane S17.

In Example 4, a total effective focal length f of the optical imaging system is 6.19 mm, a distance TTL along the optical axis from the object-side surface S1 of the first lens E1 to the imaging plane S17 is 7.10 mm, half of a diagonal length ImgH of an effective pixel area on the imaging plane S17 is 6.04 mm, and half of a maximal field-of-view Semi-FOV is 43.90°.

Table 7 is a table illustrating basic parameters of the optical imaging system of Example 4, wherein the units for the radius of curvature, the thickness/distance and the focal length are millimeter (mm). Table 8 shows high-order coefficients applicable to each aspheric surface in Example 4, wherein the surface shape of each aspheric surface may be defined by the formula (1) given in the above Example 1.

TABLE 7

| | | | | Material | | | |
|---|---|---|---|---|---|---|---|
| Surface number | Surface type | Radius of curvature | Thickness/ Distance | Refractive index | Abbe number | Focal length | Conic coefficient |
| OBJ | Spherical | Infinite | Infinite | | | | |
| STO | Spherical | Infinite | −0.6858 | | | | |
| S1 | Aspheric | 2.2776 | 0.9571 | 1.55 | 56.1 | 5.28 | −0.0685 |
| S2 | Aspheric | 9.2477 | 0.0936 | | | | −37.8089 |
| S3 | Aspheric | 17.6795 | 0.3000 | 1.68 | 19.2 | −14.56 | 38.1772 |
| S4 | Aspheric | 6.2896 | 0.3413 | | | | 3.1094 |
| S5 | Aspheric | 39.8165 | 0.3000 | 1.68 | 19.2 | 388.99 | 16.6335 |
| S6 | Aspheric | 46.7588 | 0.1768 | | | | 89.9285 |
| S7 | Aspheric | 163.4556 | 0.4320 | 1.55 | 56.1 | 84.76 | 99.0000 |
| S8 | Aspheric | −64.4898 | 0.5294 | | | | 63.1235 |

TABLE 7-continued

| Surface number | Surface type | Radius of curvature | Thickness/ Distance | Material | | Focal length | Conic coefficient |
|---|---|---|---|---|---|---|---|
| | | | | Refractive index | Abbe number | | |
| S9 | Aspheric | 14.6777 | 0.5083 | 1.57 | 37.3 | −223.95 | −11.3429 |
| S10 | Aspheric | 12.9994 | 0.5340 | | | | −26.2209 |
| S11 | Aspheric | 3.9272 | 0.6964 | 1.55 | 56.1 | 8.05 | 0.0000 |
| S12 | Aspheric | 34.6219 | 0.9019 | | | | 1.5885 |
| S13 | Aspheric | −2.4262 | 0.5516 | 1.54 | 55.7 | −4.09 | −3.9494 |
| S14 | Aspheric | 25.0652 | 0.1833 | | | | 23.6396 |
| S15 | Spherical | Infinite | 0.2100 | 1.51 | 64.2 | | |
| S16 | Spherical | Infinite | 0.3844 | | | | |
| S17 | Spherical | Infinite | | | | | |

TABLE 8

| Surface number | A4 | A6 | A8 | A10 | A12 |
|---|---|---|---|---|---|
| S1 | 5.5347E−04 | 1.4822E−03 | −9.4858E−04 | −7.8790E−04 | 2.1405E−03 |
| S2 | −1.8644E−02 | 8.0896E−03 | 1.5880E−02 | −3.4046E−02 | 3.3840E−02 |
| S3 | −2.6803E−02 | 2.6259E−02 | 1.1719E−02 | −4.5817E−02 | 5.3513E−02 |
| S4 | −5.7836E−03 | 1.5140E−02 | 2.8847E−02 | −9.0202E−02 | 1.2862E−01 |
| S5 | −2.5466E−02 | 6.8339E−03 | 2.0962E−03 | −2.9770E−02 | 5.5307E−02 |
| S6 | −2.5214E−02 | 1.6752E−02 | −2.1619E−02 | 2.3199E−02 | −1.9486E−02 |
| S7 | −3.4756E−02 | 2.0629E−02 | −3.7162E−02 | 5.0383E−02 | −5.2425E−02 |
| S8 | −3.6566E−02 | 1.5742E−02 | −2.0594E−02 | 1.4669E−02 | −6.3460E−03 |
| S9 | −4.6253E−02 | 1.2620E−02 | −7.7716E−03 | 6.7736E−03 | −6.3443E−03 |
| S10 | −5.8423E−02 | 1.3765E−02 | −1.8041E−03 | −2.9164E−04 | −7.2114E−06 |
| S11 | −2.1525E−02 | −8.6412E−03 | 3.9236E−03 | −1.1197E−03 | 2.0514E−04 |
| S12 | 2.0084E−02 | −1.7202E−02 | 4.9797E−03 | −9.0220E−04 | 1.1157E−04 |
| S13 | −1.7323E−02 | −1.2965E−03 | 1.7220E−03 | −3.4146E−04 | 3.4498E−05 |
| S14 | −1.3868E−02 | 7.0450E−04 | 3.5826E−04 | −9.9500E−05 | 1.1889E−05 |

| Surface number | A14 | A16 | A18 | A20 |
|---|---|---|---|---|
| S1 | −1.8630E−03 | 8.1928E−04 | −1.8737E−04 | 1.7148E−05 |
| S2 | −2.0413E−02 | 7.4335E−03 | −1.4941E−03 | 1.2710E−04 |
| S3 | −3.5837E−02 | 1.4399E−02 | −3.1931E−03 | 3.0145E−04 |
| S4 | −1.1081E−01 | 5.8090E−02 | −1.6944E−02 | 2.1153E−03 |
| S5 | −5.4653E−02 | 3.0950E−02 | −9.3818E−03 | 1.1831E−03 |
| S6 | 1.2271E−02 | −5.2126E−03 | 1.3972E−03 | −1.7189E−04 |
| S7 | 3.6879E−02 | −1.6292E−02 | 4.0462E−03 | −4.2145E−04 |
| S8 | 7.0869E−04 | 6.0039E−04 | −2.6963E−04 | 3.5511E−05 |
| S9 | 3.4379E−03 | −1.0382E−03 | 1.6318E−04 | −1.0277E−05 |
| S10 | 7.5881E−05 | −2.0581E−05 | 2.1317E−06 | −7.9479E−08 |
| S11 | −2.2360E−05 | 1.3996E−06 | −4.6184E−08 | 5.9107E−10 |
| S12 | −9.2486E−06 | 4.8503E−07 | −1.4444E−08 | 1.8538E−10 |
| S13 | −2.0650E−06 | 7.4381E−08 | −1.4983E−09 | 1.3021E−11 |
| S14 | −7.9880E−07 | 3.1322E−08 | −6.6882E−10 | 6.0021E−12 |

Figure 8A:
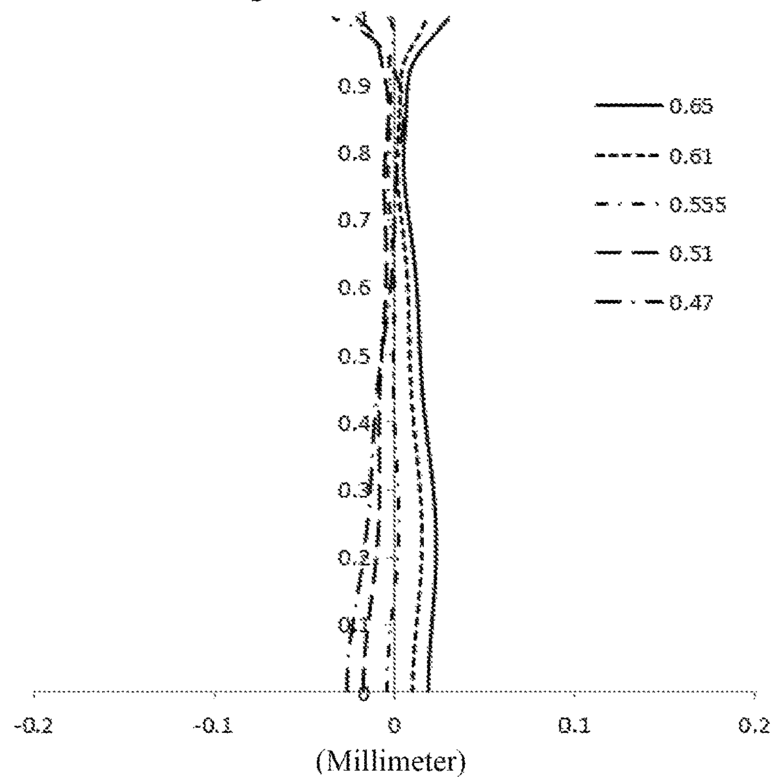
FIGS. 8A to 8D illustrate a longitudinal aberration curve, an astigmatic curve, a distortion curve, and a lateral color curve of the optical imaging lens assembly of the Example 4, respectively.
Figure 8B:
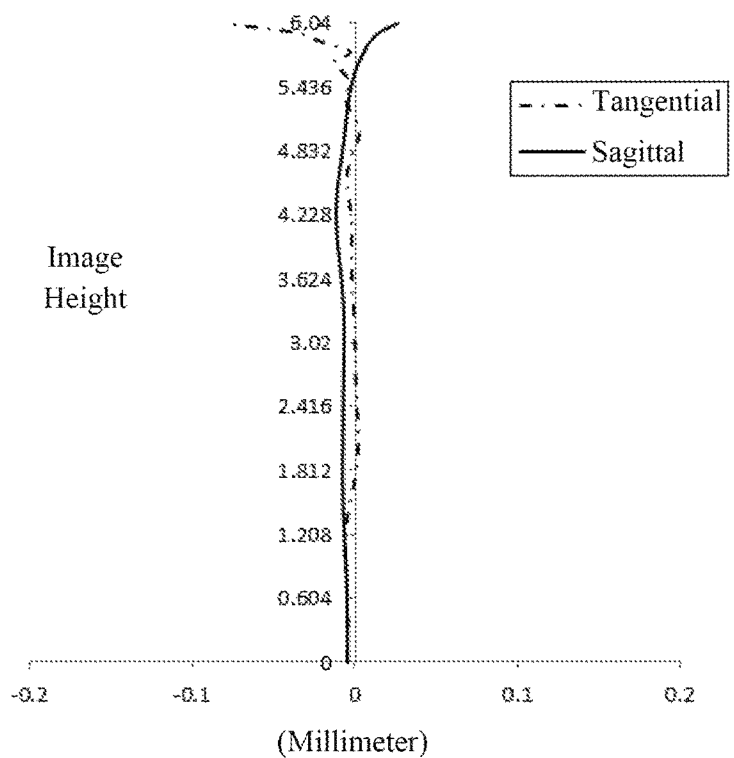
Figure 8C:
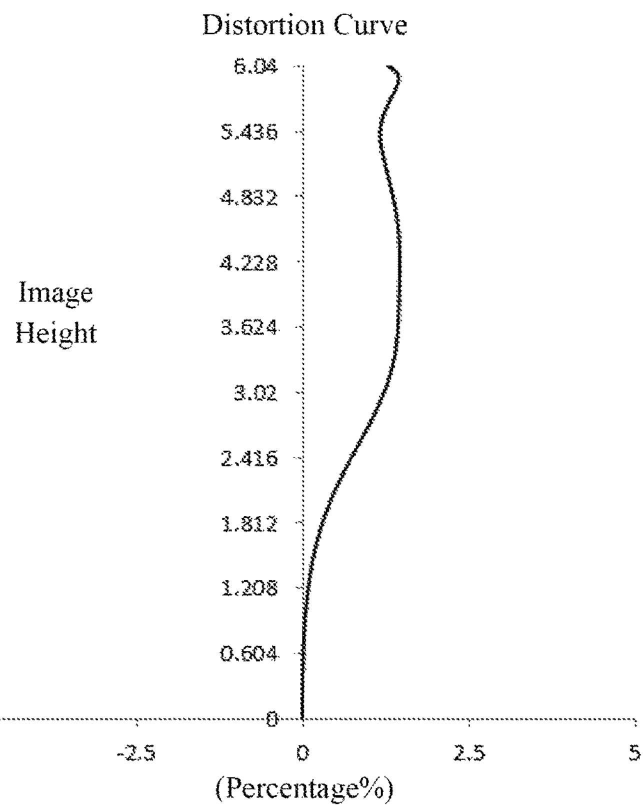
Figure 8D:
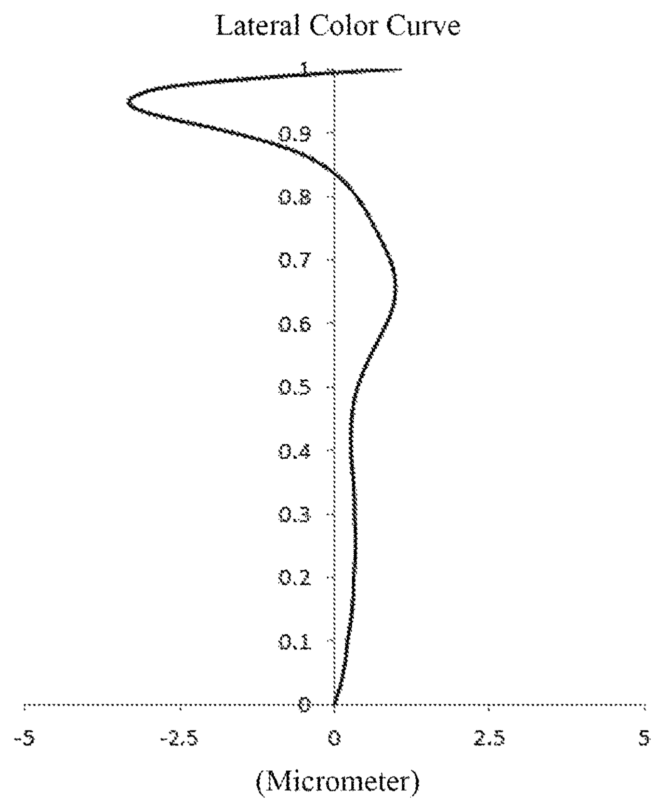

FIG. 8A illustrates a longitudinal aberration curve of the optical imaging system according to Example 4, representing deviations of focal points converged by light of different wavelengths after passing through the system. FIG. 8B illustrates an astigmatic curve of the optical imaging system according to Example 4, representing a curvature of a tangential plane and a curvature of a sagittal plane. FIG. 8C illustrates a distortion curve of the optical imaging system according to Example 4, representing amounts of distortion corresponding to different image heights. FIG. 8D illustrates a lateral color curve of the optical imaging system according to Example 4, representing deviations of different image heights on an imaging plane after light passes through the system. It can be seen from FIG. 8A to FIG. 8D that the optical imaging system provided in Example 4 may achieve good image quality.

Example 5

Figure 9:
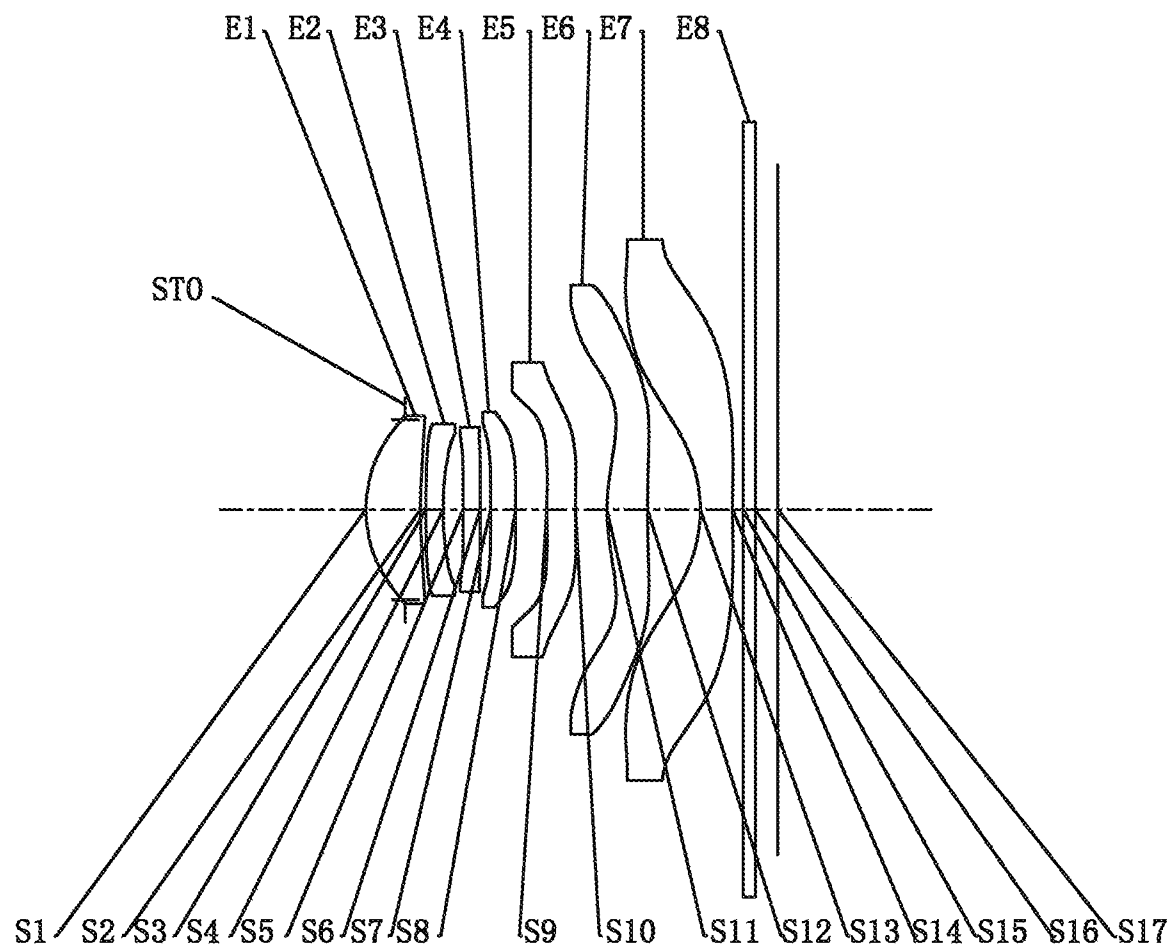
FIG. 9 illustrates a schematic structural view of an optical imaging lens assembly according to Example 5 of the present disclosure.

An optical imaging system according to Example 5 of the present disclosure is described below with reference to FIG. 9 to FIG. 10D. FIG. 9 shows a schematic structural view of the optical imaging system according to Example 5 of the present disclosure.

As shown in FIG. 9, the optical imaging system includes a stop STO, a first lens E1, a second lens E2, a third lens E3, a fourth lens E4, a fifth lens E5, a sixth lens E6, a seventh lens E7 and an optical filter E8, which are sequentially arranged from an object side to an image side along an optical axis.

The first lens E1 has positive refractive power, an object-side surface S1 thereof is a convex surface, and an image-side surface S2 thereof is a concave surface. The second lens E2 has negative refractive power, an object-side surface S3 thereof is a convex surface, and an image-side surface S4 thereof is a concave surface. The third lens E3 has negative refractive power, an object-side surface S5 thereof is a convex surface, and an image-side surface S6 thereof is a concave surface. The fourth lens E4 has positive refractive power, an object-side surface S7 thereof is a convex surface, and an image-side surface S8 thereof is a convex surface. The fifth lens E5 has negative refractive power, an object-side surface S9 thereof is a convex surface, and an image-side surface S10 thereof is a concave surface. The sixth lens E6 has positive refractive power, an object-side surface S11 thereof is a convex surface, and an image-side surface S12 thereof is a concave surface. The seventh lens E7 has negative refractive power, an object-side surface S13 thereof is a concave surface, and an image-side surface S14 thereof is a concave surface. The optical filter E8 has an object-side surface S15 and an image-side surface S16. The optical imaging system has an imaging plane S17, and light from an object sequentially passes through the respective surfaces S1 to S16 and is finally imaged on the imaging plane S17.

In Example 5, a total effective focal length f of the optical imaging system is 6.19 mm, a distance TTL along the optical axis from the object-side surface S1 of the first lens E1 to the imaging plane S17 is 7.10 mm, half of a diagonal length ImgH of an effective pixel area on the imaging plane S17 is 6.04 mm, and half of a maximal field-of-view Semi-FOV is 43.88°.

Table 9 is a table illustrating basic parameters of the optical imaging system of Example 5, wherein the units for the radius of curvature, the thickness/distance and the focal length are millimeter (mm). Table 10 shows high-order coefficients applicable to each aspheric surface in Example 5, wherein the surface shape of each aspheric surface may be defined by the formula (1) given in the above Example 1.

TABLE 9

| | | | | Material | | | |
|---|---|---|---|---|---|---|---|
| Surface number | Surface type | Radius of curvature | Thickness/ Distance | Refractive index | Abbe number | Focal length | Conic coefficient |
| OBJ | Spherical | Infinite | Infinite | | | | |
| STO | Spherical | Infinite | −0.6753 | | | | |
| S1 | Aspheric | 2.2731 | 0.9407 | 1.55 | 56.1 | 5.28 | −0.0676 |
| S2 | Aspheric | 9.1811 | 0.0923 | | | | −36.6339 |
| S3 | Aspheric | 16.8089 | 0.3000 | 1.68 | 19.2 | −14.56 | 39.4861 |
| S4 | Aspheric | 6.1731 | 0.3413 | | | | 3.3008 |
| S5 | Aspheric | 40.6564 | 0.3000 | 1.68 | 19.2 | −465.18 | 55.2379 |
| S6 | Aspheric | 35.9041 | 0.1768 | | | | 79.4808 |
| S7 | Aspheric | 67.9808 | 0.4345 | 1.55 | 56.1 | 67.39 | −99.0000 |
| S8 | Aspheric | −80.0000 | 0.5315 | | | | −76.0193 |
| S9 | Aspheric | 13.0632 | 0.4974 | 1.57 | 37.3 | −242.80 | −16.1755 |
| S10 | Aspheric | 11.7722 | 0.5467 | | | | −31.7771 |
| S11 | Aspheric | 3.8608 | 0.6931 | 1.55 | 56.1 | 7.96 | 0.0000 |
| S12 | Aspheric | 32.5310 | 0.9153 | | | | 3.8397 |
| S13 | Aspheric | −2.4262 | 0.5528 | 1.54 | 55.7 | −4.14 | −3.9389 |
| S14 | Aspheric | 25.0652 | 0.1833 | | | | 23.6914 |
| S15 | Spherical | Infinite | 0.2100 | 1.51 | 64.2 | | |
| S16 | Spherical | Infinite | 0.3844 | | | | |
| S17 | Spherical | Infinite | | | | | |

TABLE 10

| Surface number | A4 | A6 | A8 | A10 | A12 |
|---|---|---|---|---|---|
| S1 | 6.4899E−04 | 1.6103E−03 | −1.4413E−03 | 1.3164E−05 | 1.4603E−03 |
| S2 | −1.8572E−02 | 8.0928E−03 | 1.6437E−02 | −3.5512E−02 | 3.5712E−02 |
| S3 | −2.6538E−02 | 2.6399E−02 | 1.0566E−02 | −4.4393E−02 | 5.2838E−02 |
| S4 | −5.3484E−03 | 1.5087E−02 | 2.6928E−02 | −8.5180E−02 | 1.2152E−01 |
| S5 | −2.5221E−02 | 6.3294E−03 | 1.6827E−03 | −2.5887E−02 | 4.7929E−02 |
| S6 | −2.5771E−02 | 1.9256E−02 | −2.9260E−02 | 3.6807E−02 | −3.4055E−02 |
| S7 | −3.5224E−02 | 2.3480E−02 | −4.5702E−02 | 6.3823E−02 | −6.5174E−02 |
| S8 | −3.6391E−02 | 1.4595E−02 | −1.7422E−02 | 9.6158E−03 | −1.5773E−03 |
| S9 | −4.8931E−02 | 1.6740E−02 | −1.2272E−02 | 1.0198E−02 | −7.9995E−03 |
| S10 | −6.0762E−02 | 1.6584E−02 | −3.8681E−03 | 7.2126E−04 | −3.4468E−04 |
| S11 | −2.2050E−02 | −8.0797E−03 | 3.7193E−03 | −1.0836E−03 | 2.0213E−04 |
| S12 | 1.9669E−02 | −1.6791E−02 | 4.8480E−03 | −8.8057E−04 | 1.0960E−04 |
| S13 | −1.7382E−02 | −1.2332E−03 | 1.7032E−03 | −3.3830E−04 | 3.4185E−05 |
| S14 | −1.3885E−02 | 7.7177E−04 | 3.3494E−04 | −9.5143E−05 | 1.1412E−05 |

| Surface number | A14 | A16 | A18 | A20 |
|---|---|---|---|---|
| S1 | −1.5355E−03 | 7.3120E−04 | −1.7581E−04 | 1.6629E−05 |
| S2 | −2.1798E−02 | 8.0361E−03 | −1.6367E−03 | 1.4122E−04 |
| S3 | −3.5921E−02 | 1.4636E−02 | −3.2895E−03 | 3.1462E−04 |
| S4 | −1.0465E−01 | 5.4904E−02 | −1.6052E−02 | 2.0124E−03 |
| S5 | −4.7445E−02 | 2.7033E−02 | −8.2675E−03 | 1.0539E−03 |
| S6 | 2.2011E−02 | −9.1644E−03 | 2.2763E−03 | −2.5360E−04 |

TABLE 10-continued

| | | | | |
|---|---|---|---|---|
| S7 | 4.4385E−02 | −1.8933E−02 | 4.5439E−03 | −4.5916E−04 |
| S8 | −2.0283E−03 | 1.5456E−03 | −4.5087E−04 | 5.0340E−05 |
| S9 | 3.9218E−03 | −1.1161E−03 | 1.6873E−04 | −1.0348E−05 |
| S10 | 1.4942E−04 | −3.0428E−05 | 2.8594E−06 | −1.0207E−07 |
| S11 | −2.2430E−05 | 1.4431E−06 | −5.0551E−08 | 7.8926E−10 |
| S12 | −9.1506E−06 | 4.8276E−07 | −1.4433E−08 | 1.8559E−10 |
| S13 | −2.0467E−06 | 7.3777E−08 | −1.4882E−09 | 1.2961E−11 |
| S14 | −7.6749E−07 | 3.0108E−08 | −6.4325E−10 | 5.7755E−12 |

Figure 10A:
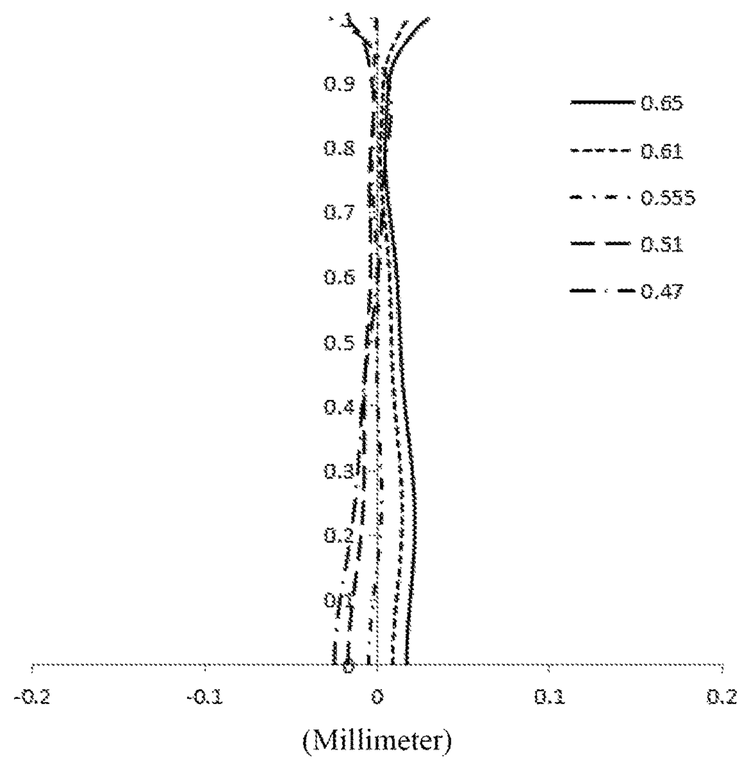
FIGS. 10A to 10D illustrate a longitudinal aberration curve, an astigmatic curve, a distortion curve, and a lateral color curve of the optical imaging lens assembly of the Example 5, respectively.
Figure 10B:
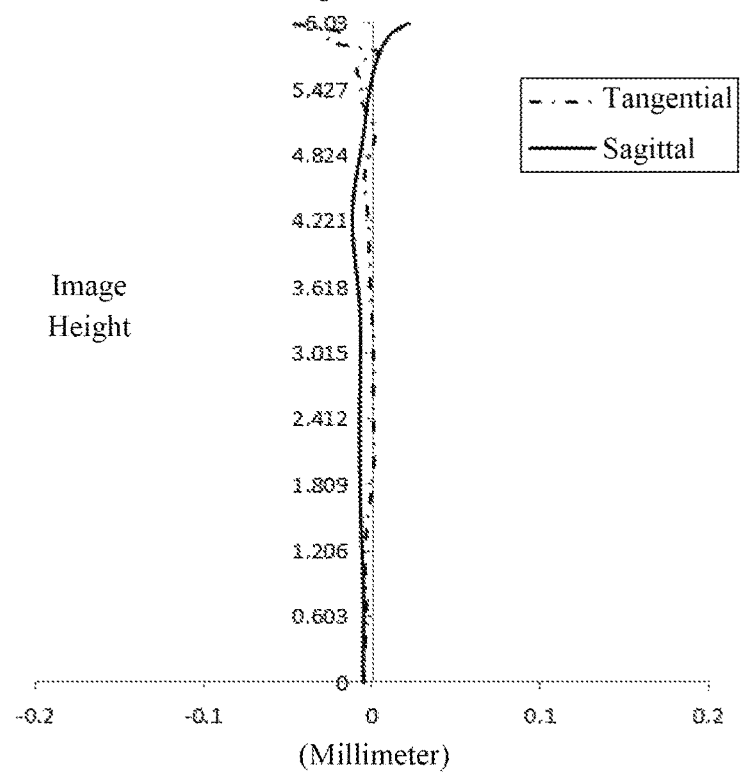
Figure 10C:
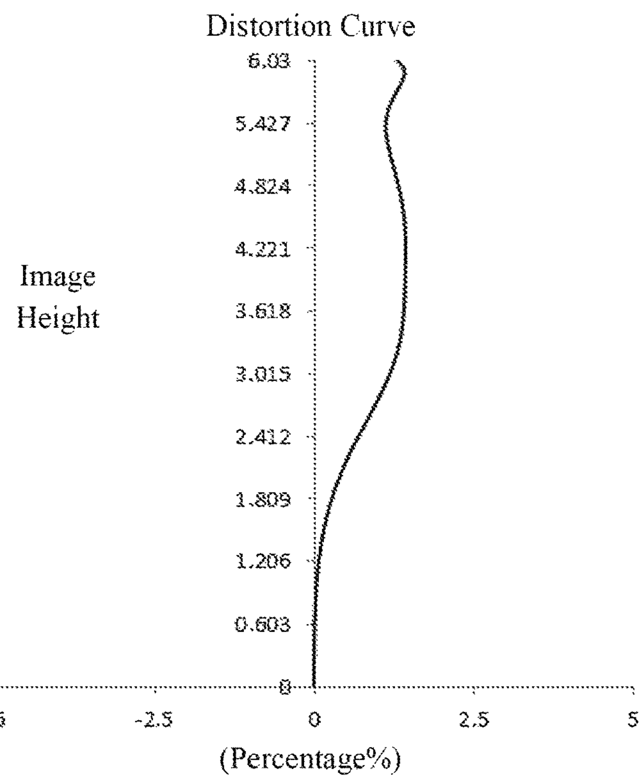
Figure 10D:
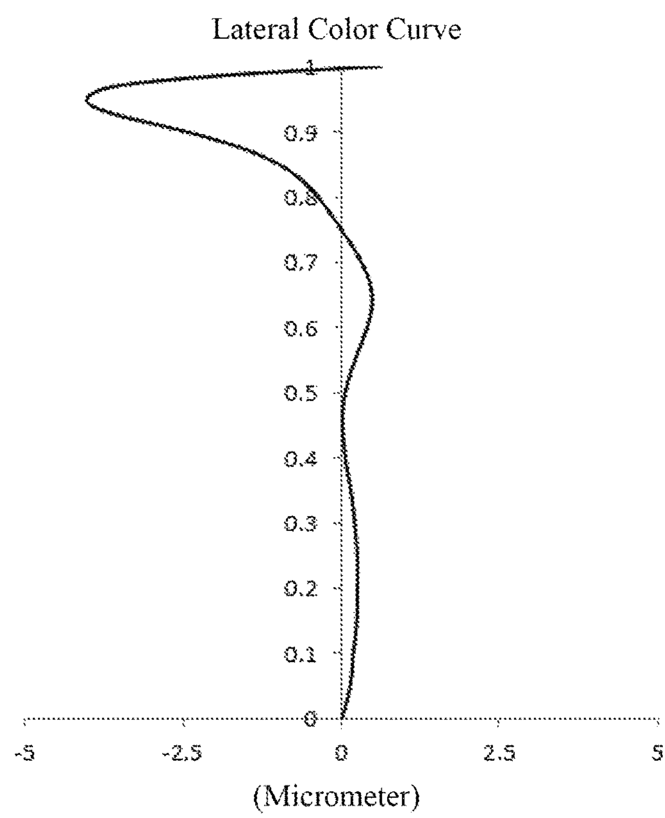

FIG. 10A illustrates a longitudinal aberration curve of the optical imaging system according to Example 5, representing deviations of focal points converged by light of different wavelengths after passing through the system. FIG. 10B illustrates an astigmatic curve of the optical imaging system according to Example 5, representing a curvature of a tangential plane and a curvature of a sagittal plane. FIG. 10C illustrates a distortion curve of the optical imaging system according to Example 5, representing amounts of distortion corresponding to different image heights. FIG. 10D illustrates a lateral color curve of the optical imaging system according to Example 5, representing deviations of different image heights on an imaging plane after light passes through the system. It can be seen from FIG. 10A to FIG. 10D that the optical imaging system provided in Example 5 may achieve good image quality.

Example 6

Figure 11:
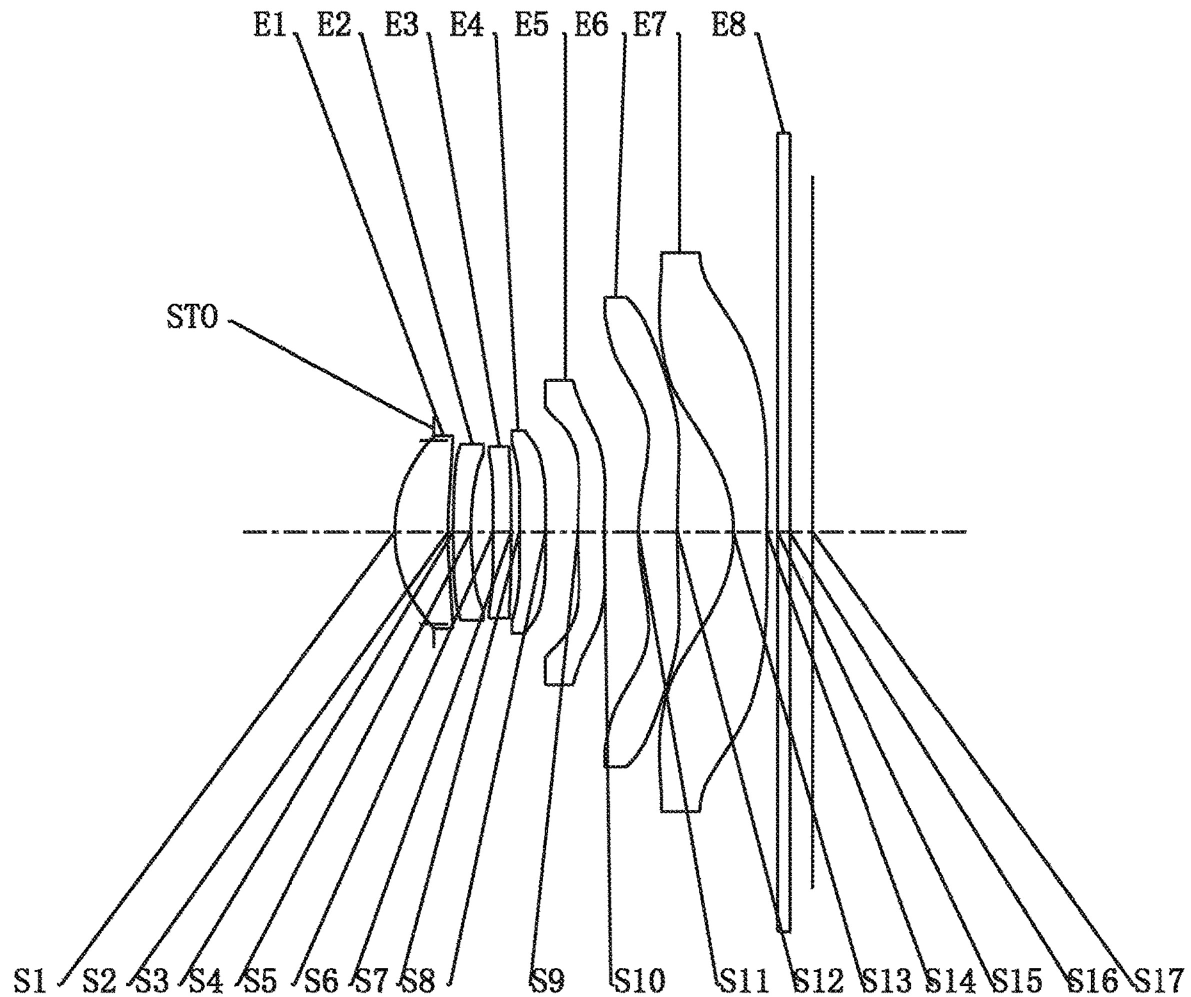
FIG. 11 illustrates a schematic structural view of an optical imaging lens assembly according to Example 6 of the present disclosure.

An optical imaging system according to Example 6 of the present disclosure is described below with reference to FIG. 11 to FIG. 12D. FIG. 11 shows a schematic structural view of the optical imaging system according to Example 6 of the present disclosure.

As shown in FIG. 11, the optical imaging system includes a stop STO, a first lens E1, a second lens E2, a third lens E3, a fourth lens E4, a fifth lens E5, a sixth lens E6, a seventh lens E7 and an optical filter E8, which are sequentially arranged from an object side to an image side along an optical axis.

The first lens E1 has positive refractive power, an object-side surface S1 thereof is a convex surface, and an image-side surface S2 thereof is a concave surface. The second lens E2 has negative refractive power, an object-side surface S3 thereof is a convex surface, and an image-side surface S4 thereof is a concave surface. The third lens E3 has negative refractive power, an object-side surface S5 thereof is a concave surface, and an image-side surface S6 thereof is a concave surface. The fourth lens E4 has positive refractive power, an object-side surface S7 thereof is a convex surface, and an image-side surface S8 thereof is a convex surface. The fifth lens E5 has negative refractive power, an object-side surface S9 thereof is a convex surface, and an image-side surface S10 thereof is a concave surface. The sixth lens E6 has positive refractive power, an object-side surface S11 thereof is a convex surface, and an image-side surface S12 thereof is a concave surface. The seventh lens E7 has negative refractive power, an object-side surface S13 thereof is a concave surface, and an image-side surface S14 thereof is a concave surface. The optical filter E8 has an object-side surface S15 and an image-side surface S16. The optical imaging system has an imaging plane S17, and light from an object sequentially passes through the respective surfaces S1 to S16 and is finally imaged on the imaging plane S17.

In Example 6, a total effective focal length f of the optical imaging system is 6.14 mm, a distance TTL along the optical axis from the object-side surface S1 of the first lens E1 to the imaging plane S17 is 7.10 mm, half of a diagonal length ImgH of an effective pixel area on the imaging plane S17 is 6.04 mm, and half of a maximal field-of-view Semi-FOV is 44.07°.

Table 11 is a table illustrating basic parameters of the optical imaging system of Example 6, wherein the units for the radius of curvature, the thickness/distance and the focal length are millimeter (mm). Table 12 shows high-order coefficients applicable to each aspheric surface in Example 6, wherein the surface shape of each aspheric surface may be defined by the formula (1) given in the above Example 1.

TABLE 11

| | | | | Material | | | |
|---|---|---|---|---|---|---|---|
| Surface number | Surface type | Radius of curvature | Thickness/ Distance | Refractive index | Abbe number | Focal length | Conic coefficient |
| OBJ | Spherical | Infinite | Infinite | | | | |
| STO | Spherical | Infinite | −0.6582 | | | | |
| S1 | Aspheric | 2.2892 | 0.9068 | 1.55 | 56.1 | 5.32 | −0.0635 |
| S2 | Aspheric | 9.2779 | 0.0865 | | | | −31.7885 |
| S3 | Aspheric | 13.6765 | 0.3000 | 1.68 | 19.2 | −14.91 | 34.3725 |
| S4 | Aspheric | 5.7583 | 0.3841 | | | | 3.2521 |
| S5 | Aspheric | −186.5916 | 0.3000 | 1.68 | 19.2 | −61.90 | 45.8947 |
| S6 | Aspheric | 54.1406 | 0.1416 | | | | −99.0000 |
| S7 | Aspheric | 25.7144 | 0.4428 | 1.55 | 56.1 | 44.13 | −99.0000 |
| S8 | Aspheric | −380.0000 | 0.5547 | | | | 0.0000 |
| S9 | Aspheric | 8.2720 | 0.4500 | 1.57 | 37.3 | −1986.79 | −30.1949 |
| S10 | Aspheric | 8.0498 | 0.5780 | | | | −44.7096 |
| S11 | Aspheric | 3.6125 | 0.6598 | 1.55 | 56.1 | 7.55 | −1.0000 |
| S12 | Aspheric | 27.2882 | 0.9535 | | | | 6.8192 |
| S13 | Aspheric | −2.4262 | 0.5640 | 1.54 | 55.7 | −4.09 | −3.6352 |
| S14 | Aspheric | 25.0652 | 0.1835 | | | | 24.3678 |
| S15 | Spherical | Infinite | 0.2100 | 1.51 | 64.2 | | |
| S16 | Spherical | Infinite | 0.3847 | | | | |
| S17 | Spherical | Infinite | | | | | |

TABLE 12

| Surface number | A4 | A6 | A8 | A10 | A12 |
|---|---|---|---|---|---|
| S1 | 2.2024E−04 | 3.7645E−03 | −6.4813E−03 | 7.2063E−03 | −4.9498E−03 |
| S2 | −1.7575E−02 | 8.2097E−03 | 1.4931E−02 | −3.4176E−02 | 3.5841E−02 |
| S3 | −2.3745E−02 | 2.3058E−02 | 9.0119E−03 | −3.9568E−02 | 4.9226E−02 |
| S4 | −2.4442E−03 | 1.1137E−02 | 2.5101E−02 | −7.4482E−02 | 1.0429E−01 |
| S5 | −2.6434E−02 | 1.7676E−02 | −3.7367E−02 | 5.2728E−02 | −5.0420E−02 |
| S6 | −3.4517E−02 | 3.5104E−02 | −5.3940E−02 | 6.2778E−02 | −5.1093E−02 |
| S7 | −4.7219E−02 | 4.2249E−02 | −7.2593E−02 | 9.1459E−02 | −8.4663E−02 |
| S8 | −4.2130E−02 | 2.1293E−02 | −2.3062E−02 | 1.3189E−02 | −3.3459E−03 |
| S9 | −5.6713E−02 | 2.5738E−02 | −1.5446E−02 | 7.9398E−03 | −4.3362E−03 |
| S10 | −6.9439E−02 | 2.7716E−02 | −1.2138E−02 | 4.6908E−03 | −1.6087E−03 |
| S11 | −2.4797E−02 | −3.8452E−03 | 2.2003E−03 | −7.1812E−04 | 1.4051E−04 |
| S12 | 1.4665E−02 | −1.3875E−02 | 4.2259E−03 | −8.2491E−04 | 1.1054E−04 |
| S13 | −1.9321E−02 | −6.7720E−04 | 1.7266E−03 | −3.5784E−04 | 3.6854E−05 |
| S14 | −1.3083E−02 | 7.6594E−04 | 2.7779E−04 | −8.0604E−05 | 9.6903E−06 |

| Surface number | A14 | A16 | A18 | A20 |
|---|---|---|---|---|
| S1 | 2.0376E−03 | −4.7690E−04 | 5.0222E−05 | −1.2518E−06 |
| S2 | −2.2676E−02 | 8.6291E−03 | −1.8092E−03 | 1.6034E−04 |
| S3 | −3.4929E−02 | 1.4792E−02 | −3.4383E−03 | 3.3834E−04 |
| S4 | −8.7966E−02 | 4.5031E−02 | −1.2800E−02 | 1.5564E−03 |
| S5 | 3.0559E−02 | −1.1030E−02 | 2.1596E−03 | −1.7673E−04 |
| S6 | 2.8617E−02 | −1.0437E−02 | 2.3072E−03 | −2.3550E−04 |
| S7 | 5.3527E−02 | −2.1608E−02 | 4.9765E−03 | −4.8818E−04 |
| S8 | −1.2098E−03 | 1.2245E−03 | −3.7022E−04 | 4.1352E−05 |
| S9 | 1.8205E−03 | −4.8225E−04 | 7.0067E−05 | −4.1743E−06 |
| S10 | 4.1448E−04 | −6.5394E−05 | 5.4728E−06 | −1.8604E−07 |
| S11 | −1.5496E−05 | 9.5265E−07 | −3.0143E−08 | 3.4716E−10 |
| S12 | −9.8140E−06 | 5.4226E−07 | −1.6758E−08 | 2.2042E−10 |
| S13 | −2.2315E−06 | 8.1081E−08 | −1.6465E−09 | 1.4432E−11 |
| S14 | −6.5369E−07 | 2.5785E−08 | −5.5443E−10 | 5.0052E−12 |

Figure 12A:
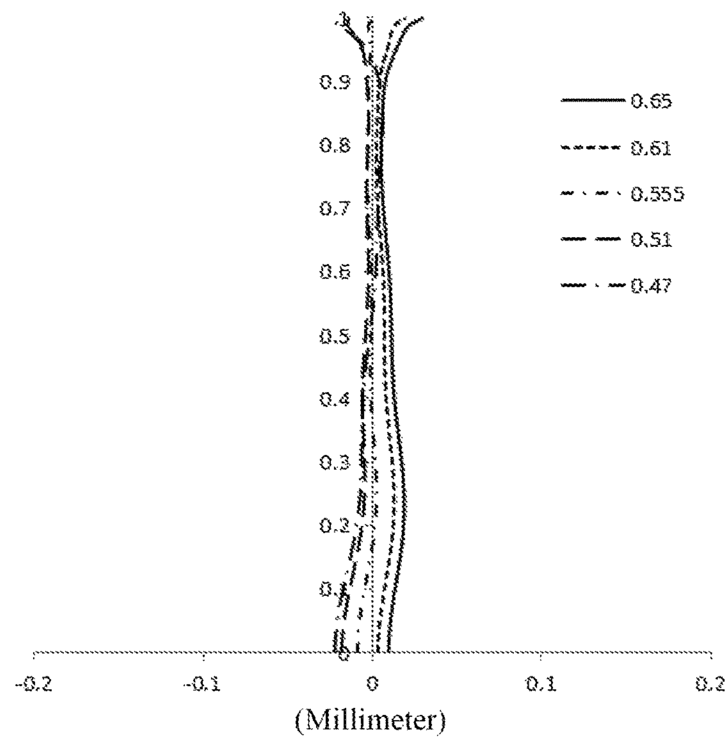
FIGS. 12A to 12D illustrate a longitudinal aberration curve, an astigmatic curve, a distortion curve, and a lateral color curve of the optical imaging lens assembly of the Example 6, respectively.
Figure 12B:
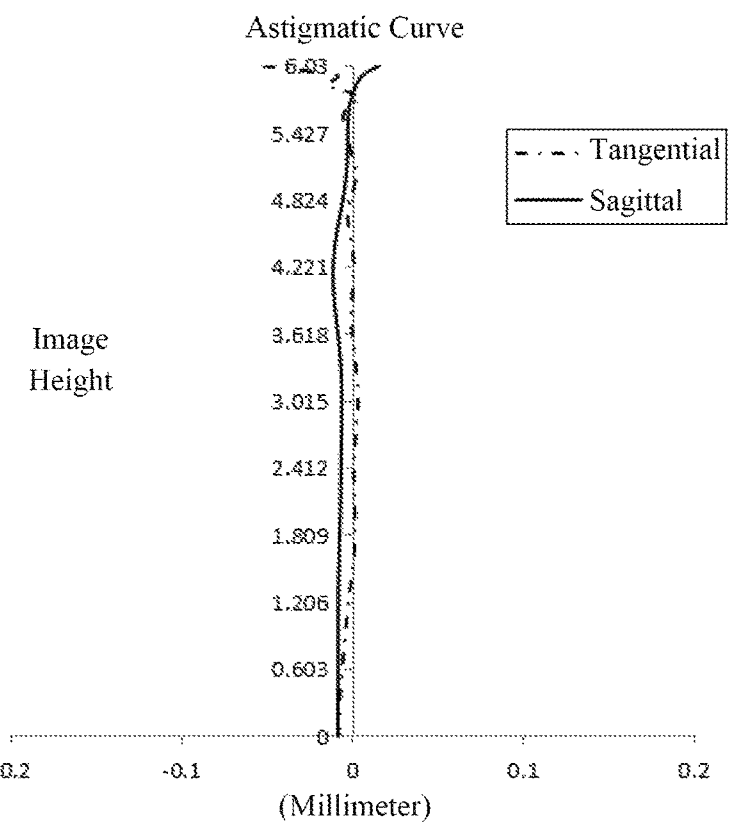
Figure 12C:
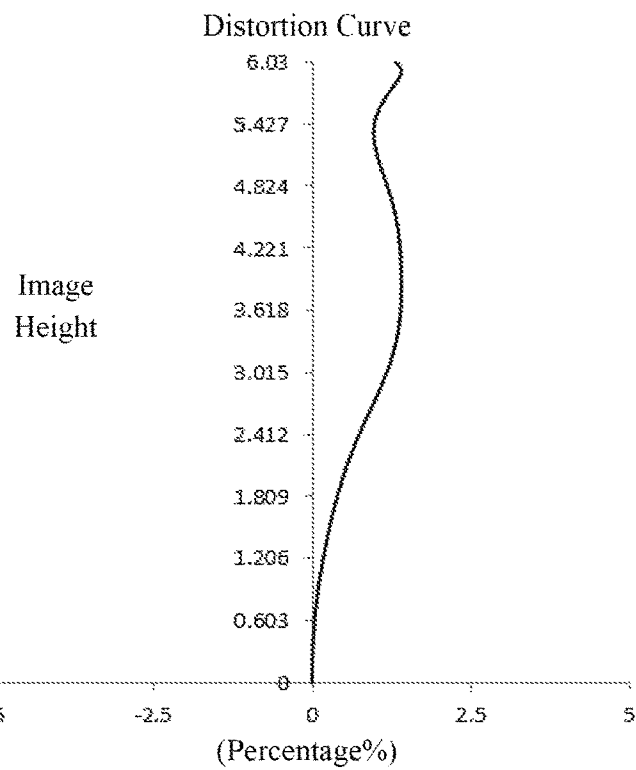
Figure 12D:
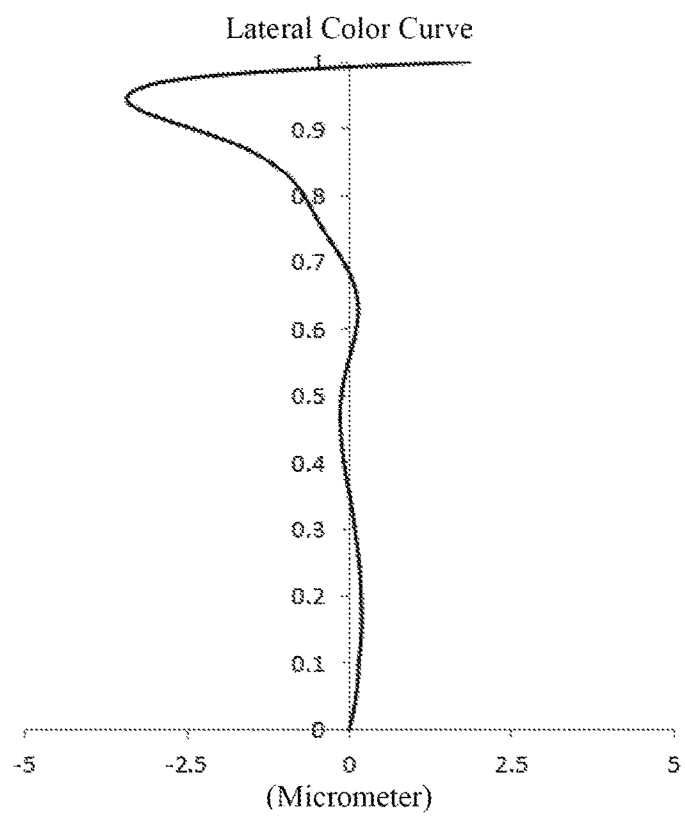

FIG. 12A illustrates a longitudinal aberration curve of the optical imaging system according to Example 6, representing deviations of focal points converged by light of different wavelengths after passing through the system. FIG. 12B illustrates an astigmatic curve of the optical imaging system according to Example 6, representing a curvature of a tangential plane and a curvature of a sagittal plane. FIG. 12C illustrates a distortion curve of the optical imaging system according to Example 6, representing amounts of distortion corresponding to different image heights. FIG. 12D illustrates a lateral color curve of the optical imaging system according to Example 6, representing deviations of different image heights on an imaging plane after light passes through the system. It can be seen from FIG. 12A to FIG. 12D that the optical imaging system provided in Example 6 may achieve good image quality.

Example 7

Figure 13:
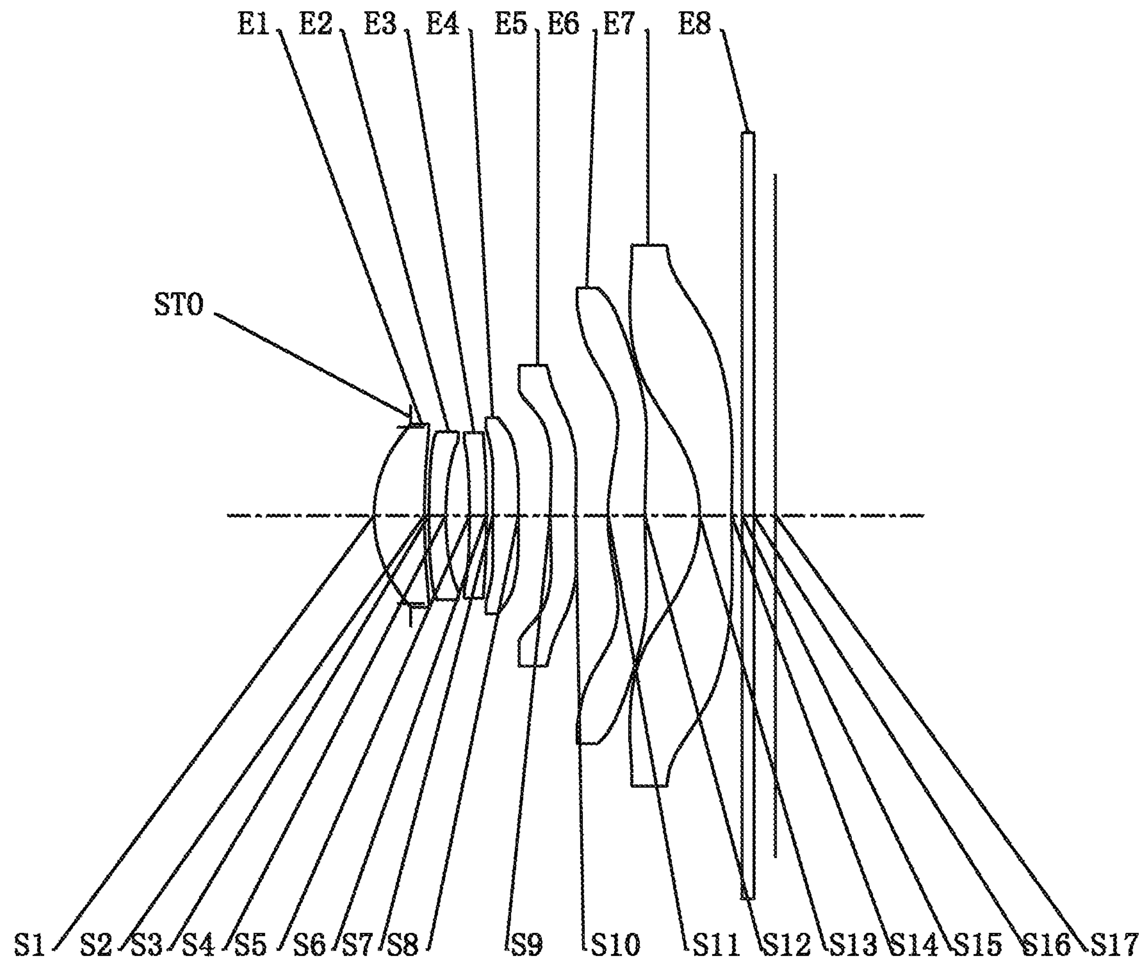
FIG. 13 illustrates a schematic structural view of an optical imaging lens assembly according to Example 7 of the present disclosure.

An optical imaging system according to Example 7 of the present disclosure is described below with reference to FIG. 13 to FIG. 14D. FIG. 13 shows a schematic structural view of the optical imaging system according to Example 7 of the present disclosure.

As shown in FIG. 13, the optical imaging system includes a stop STO, a first lens E1, a second lens E2, a third lens E3, a fourth lens E4, a fifth lens E5, a sixth lens E6, a seventh lens E7 and an optical filter E8, which are sequentially arranged from an object side to an image side along an optical axis.

The first lens E1 has positive refractive power, an object-side surface S1 thereof is a convex surface, and an image-side surface S2 thereof is a concave surface. The second lens E2 has negative refractive power, an object-side surface S3 thereof is a convex surface, and an image-side surface S4 thereof is a concave surface. The third lens E3 has negative refractive power, an object-side surface S5 thereof is a concave surface, and an image-side surface S6 thereof is a concave surface. The fourth lens E4 has positive refractive power, an object-side surface S7 thereof is a convex surface, and an image-side surface S8 thereof is a concave surface. The fifth lens E5 has negative refractive power, an object-side surface S9 thereof is a convex surface, and an image-side surface S10 thereof is a concave surface. The sixth lens E6 has positive refractive power, an object-side surface S11 thereof is a convex surface, and an image-side surface S12 thereof is a concave surface. The seventh lens E7 has negative refractive power, an object-side surface S13 thereof is a concave surface, and an image-side surface S14 thereof is a concave surface. The optical filter E8 has an object-side surface S15 and an image-side surface S16. The optical imaging system has an imaging plane S17, and light from an object sequentially passes through the respective surfaces Si to S16 and is finally imaged on the imaging plane S17.

In Example 7, a total effective focal length f of the optical imaging system is 6.10 mm, a distance TTL along the optical axis from the object-side surface S1 of the first lens E1 to the imaging plane S17 is 7.10 mm, half of a diagonal length ImgH of an effective pixel area on the imaging plane S17 is 6.04 mm, and half of a maximal field-of-view Semi-FOV is 44.28°.

Table 13 is a table illustrating basic parameters of the optical imaging system of Example 7, wherein the units for the radius of curvature, the thickness/distance and the focal length are millimeter (mm). Table 14 shows high-order coefficients applicable to each aspheric surface in Example 7, wherein the surface shape of each aspheric surface may be defined by the formula (1) given in the above Example 1.

TABLE 13

| Surface number | Surface type | Radius of curvature | Thickness/ Distance | Material: Refractive index | Material: Abbe number | Focal length | Conic coefficient |
|---|---|---|---|---|---|---|---|
| OBJ | Spherical | Infinite | Infinite | | | | |
| STO | Spherical | Infinite | −0.6517 | | | | |
| S1 | Aspheric | 2.3071 | 0.8872 | 1.55 | 56.1 | 5.38 | −0.0622 |
| S2 | Aspheric | 9.2842 | 0.0808 | | | | −31.8419 |
| S3 | Aspheric | 11.2802 | 0.3000 | 1.68 | 19.2 | −15.50 | 23.5365 |
| S4 | Aspheric | 5.3797 | 0.4179 | | | | 2.4344 |
| S5 | Aspheric | −38.1262 | 0.3000 | 1.68 | 19.2 | −36.69 | 99.0000 |
| S6 | Aspheric | 71.6593 | 0.1152 | | | | −99.0000 |
| S7 | Aspheric | 16.3410 | 0.4543 | 1.55 | 56.1 | 30.64 | −99.0000 |
| S8 | Aspheric | 700.0000 | 0.5577 | | | | 99.0000 |
| S9 | Aspheric | 7.6190 | 0.4500 | 1.57 | 37.3 | −521.40 | −32.6517 |
| S10 | Aspheric | 7.2693 | 0.5695 | | | | −34.4458 |
| S11 | Aspheric | 3.4909 | 0.6572 | 1.55 | 56.1 | 7.28 | −1.0000 |
| S12 | Aspheric | 26.7866 | 0.9663 | | | | 2.7003 |
| S13 | Aspheric | −2.4262 | 0.5655 | 1.54 | 55.7 | −4.09 | −3.5156 |
| S14 | Aspheric | 25.0652 | 0.1836 | | | | 25.0583 |
| S15 | Spherical | Infinite | 0.2100 | 1.51 | 64.2 | | |
| S16 | Spherical | Infinite | 0.3848 | | | | |
| S17 | Spherical | Infinite | | | | | |

TABLE 14

| Surface number | A4 | A6 | A8 | A10 | A12 |
|---|---|---|---|---|---|
| S1 | 4.6413E−04 | 2.6141E−03 | −3.4738E−03 | 2.5956E−03 | −6.8240E−04 |
| S2 | −1.9217E−02 | 1.0182E−02 | 1.4436E−02 | −3.4874E−02 | 3.6627E−02 |
| S3 | −2.6508E−02 | 2.4452E−02 | 7.0762E−03 | −3.5434E−02 | 4.3648E−02 |
| S4 | −3.1104E−03 | 1.0193E−02 | 2.5640E−02 | −7.3084E−02 | 1.0090E−01 |
| S5 | −2.8212E−02 | 1.8972E−02 | −3.4630E−02 | 4.2671E−02 | −3.5871E−02 |
| S6 | −4.7416E−02 | 5.3464E−02 | −7.8413E−02 | 8.8784E−02 | −7.1626E−02 |
| S7 | −5.8826E−02 | 6.1106E−02 | −9.6183E−02 | 1.1431E−01 | −1.0080E−01 |
| S8 | −4.4836E−02 | 2.4313E−02 | −2.6309E−02 | 1.6940E−02 | −6.7531E−03 |
| S9 | −5.7739E−02 | 2.3713E−02 | −8.5196E−03 | −2.5302E−04 | 1.1548E−03 |
| S10 | −7.5055E−02 | 3.0133E−02 | −1.1357E−02 | 3.1410E−03 | −7.2214E−04 |
| S11 | −2.8854E−02 | −1.8950E−03 | 1.7685E−03 | −6.5785E−04 | 1.3304E−04 |
| S12 | 1.1802E−02 | −1.2701E−02 | 4.2365E−03 | −9.0173E−04 | 1.2830E−04 |
| S13 | −2.0975E−02 | 5.6114E−05 | 1.6178E−03 | −3.4886E−04 | 3.6357E−05 |
| S14 | −1.3186E−02 | 1.2591E−03 | 7.6555E−05 | −4.1974E−05 | 5.4278E−06 |

| Surface number | A14 | A16 | A18 | A20 |
|---|---|---|---|---|
| S1 | −3.7524E−04 | 3.3468E−04 | −9.8531E−05 | 1.0225E−05 |
| S2 | −2.3042E−02 | 8.7239E−03 | −1.8237E−03 | 1.6148E−04 |
| S3 | −3.0693E−02 | 1.2983E−02 | −3.0321E−03 | 3.0095E−04 |
| S4 | −8.4500E−02 | 4.3068E−02 | −1.2196E−02 | 1.4751E−03 |
| S5 | 1.9073E−02 | −5.9096E−03 | 9.6248E−04 | −6.5265E−05 |
| S6 | 4.0114E−02 | −1.4723E−02 | 3.2503E−03 | −3.2698E−04 |
| S7 | 6.1493E−02 | −2.4218E−02 | 5.4881E−03 | −5.3387E−04 |
| S8 | 8.7058E−04 | 4.3898E−04 | −2.0505E−04 | 2.6587E−05 |
| S9 | −3.6504E−04 | 3.4067E−05 | 3.2997E−06 | −5.6041E−07 |
| S10 | 1.5841E−04 | −2.5338E−05 | 2.2285E−06 | −7.9057E−08 |
| S11 | −1.4668E−05 | 8.9146E−07 | −2.7790E−08 | 3.1723E−10 |
| S12 | −1.1771E−05 | 6.5954E−07 | −2.0419E−08 | 2.6694E−10 |
| S13 | −2.2124E−06 | 8.0623E−08 | −1.6413E−09 | 1.4423E−11 |
| S14 | −3.6727E−07 | 1.4189E−08 | −2.9469E−10 | 2.5367E−12 |

Figure 14A:
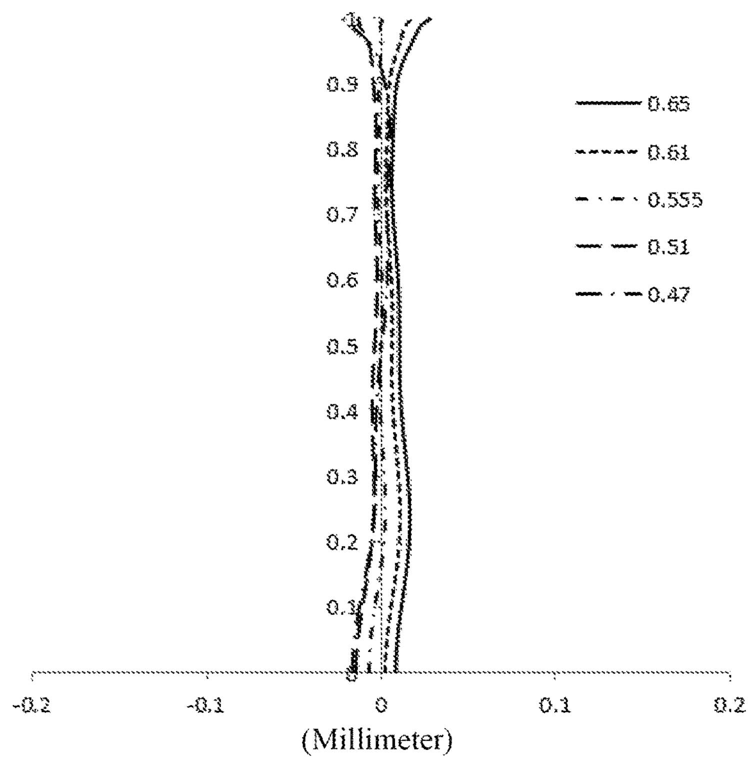
FIGS. 14A to 14D illustrate a longitudinal aberration curve, an astigmatic curve, a distortion curve, and a lateral color curve of the optical imaging lens assembly of the Example 7, respectively.
Figure 14B:
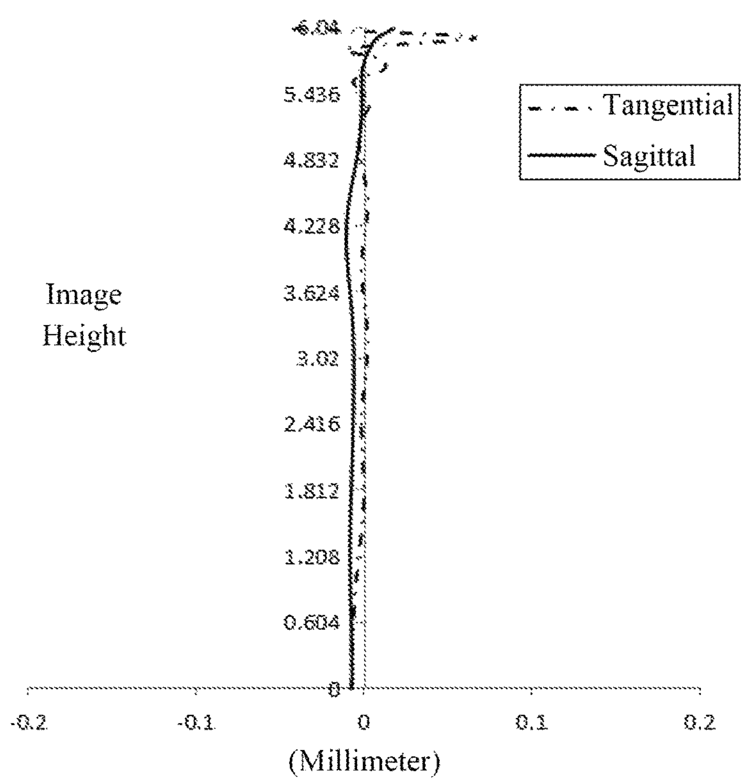
Figure 14C:
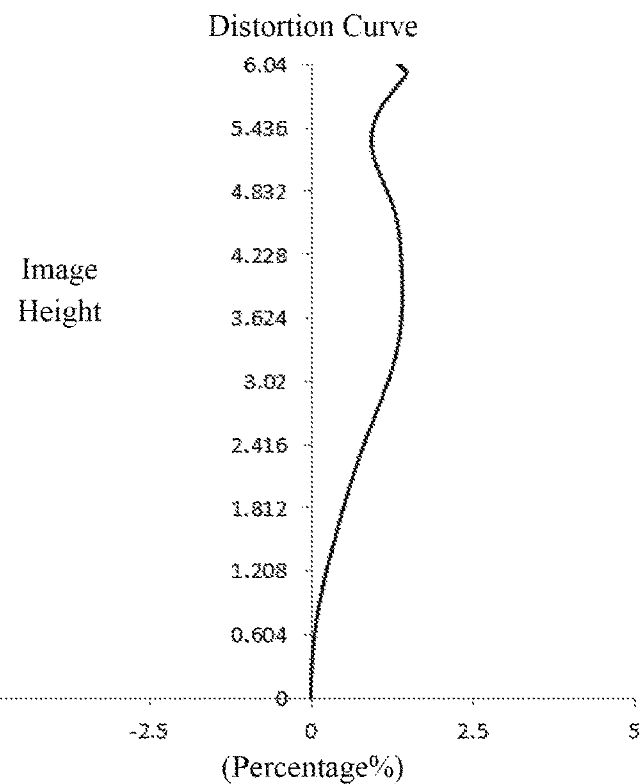
Figure 14D:
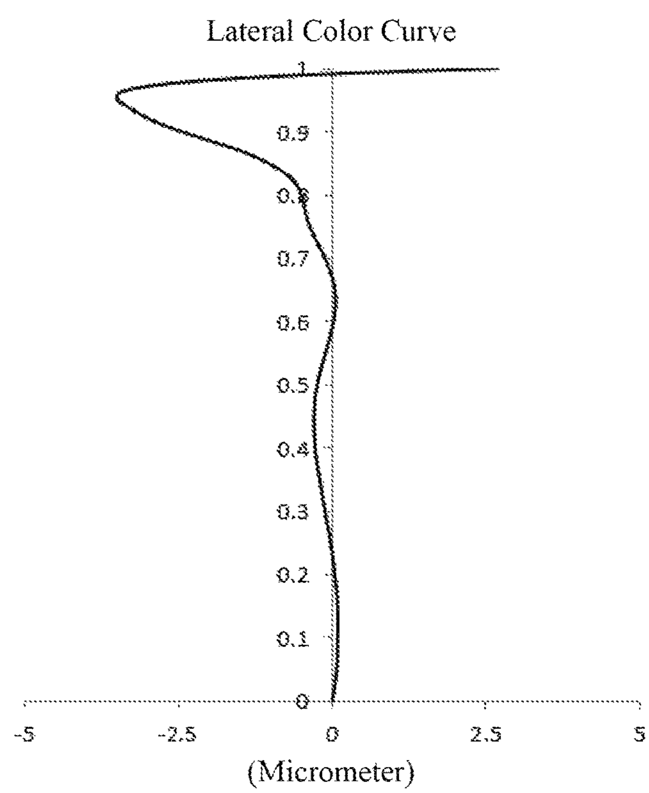

FIG. 14A illustrates a longitudinal aberration curve of the optical imaging system according to Example 7, representing deviations of focal points converged by light of different wavelengths after passing through the system. FIG. 14B illustrates an astigmatic curve of the optical imaging system according to Example 7, representing a curvature of a tangential plane and a curvature of a sagittal plane. FIG. 14C illustrates a distortion curve of the optical imaging system according to Example 7, representing amounts of distortion corresponding to different image heights. FIG. 14D illustrates a lateral color curve of the optical imaging system according to Example 7, representing deviations of different image heights on an imaging plane after light passes through the system. It can be seen from FIG. 14A to FIG. 14D that the optical imaging system provided in Example 7 may achieve good image quality.

Example 8

Figure 15:
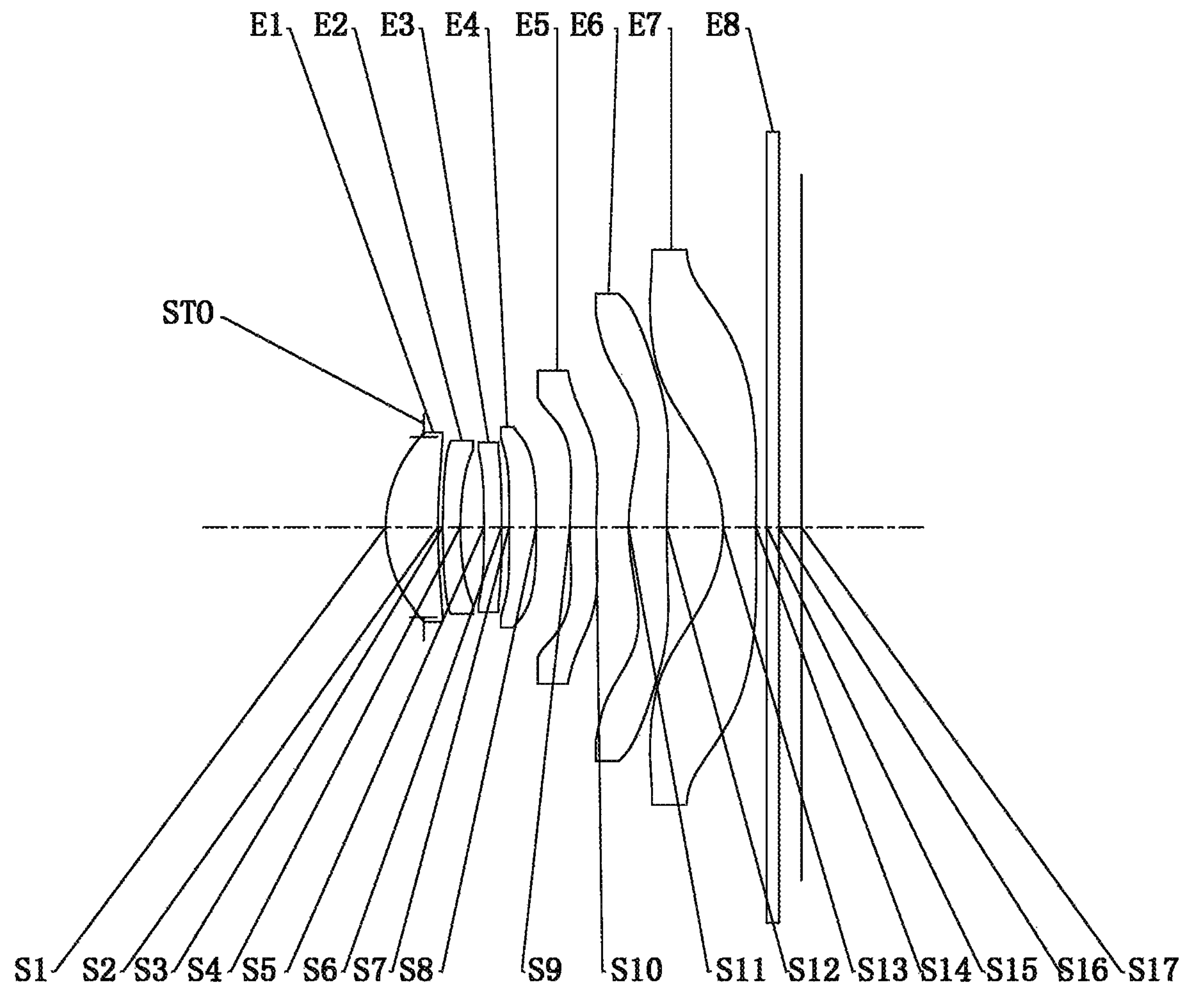
FIG. 15 illustrates a schematic structural view of an optical imaging lens assembly according to Example 8 of the present disclosure.

An optical imaging system according to Example 8 of the present disclosure is described below with reference to FIG. 15 to FIG. 16D. FIG. 15 shows a schematic structural view of the optical imaging system according to Example 8 of the present disclosure.

As shown in FIG. 15, the optical imaging system includes a stop STO, a first lens E1, a second lens E2, a third lens E3, a fourth lens E4, a fifth lens E5, a sixth lens E6, a seventh lens E7 and an optical filter E8, which are sequentially arranged from an object side to an image side along an optical axis.

The first lens E1 has positive refractive power, an object-side surface S1 thereof is a convex surface, and an image-side surface S2 thereof is a concave surface. The second lens E2 has negative refractive power, an object-side surface S3 thereof is a convex surface, and an image-side surface S4 thereof is a concave surface. The third lens E3 has negative refractive power, an object-side surface S5 thereof is a concave surface, and an image-side surface S6 thereof is a concave surface. The fourth lens E4 has positive refractive power, an object-side surface S7 thereof is a convex surface, and an image-side surface S8 thereof is a convex surface. The fifth lens E5 has negative refractive power, an object-side surface S9 thereof is a convex surface, and an image-side surface S10 thereof is a concave surface. The sixth lens E6 has positive refractive power, an object-side surface S11 thereof is a convex surface, and an image-side surface S12 thereof is a concave surface. The seventh lens E7 has negative refractive power, an object-side surface S13 thereof is a concave surface, and an image-side surface S14 thereof is a concave surface. The optical filter E8 has an object-side surface S15 and an image-side surface S16. The optical imaging system has an imaging plane S17, and light from an object sequentially passes through the respective surfaces Si to S16 and is finally imaged on the imaging plane S17.

In Example 8, a total effective focal length f of the optical imaging system is 6.11 mm, a distance TTL along the optical axis from the object-side surface S1 of the first lens E1 to the imaging plane S17 is 7.10 mm, half of a diagonal length ImgH of an effective pixel area on the imaging plane S17 is 6.05 mm, and half of a maximal field-of-view Semi-FOV is 44.25°.

Table 15 is a table illustrating basic parameters of the optical imaging system of Example 8, wherein the units for the radius of curvature, the thickness/distance and the focal length are millimeter (mm). Table 16 shows high-order coefficients applicable to each aspheric surface in Example 8, wherein the surface shape of each aspheric surface may be defined by the formula (1) given in the above Example 1.

TABLE 15

| | | | | Material | | | |
|---|---|---|---|---|---|---|---|
| Surface number | Surface type | Radius of curvature | Thickness/ Distance | Refractive index | Abbe number | Focal length | Conic coefficient |
| OBJ | Spherical | Infinite | Infinite | | | | |
| STO | Spherical | Infinite | −0.6552 | | | | |
| S1 | Aspheric | 2.3079 | 0.8926 | 1.55 | 56.1 | 5.36 | −0.0571 |
| S2 | Aspheric | 9.4352 | 0.0824 | | | | −30.7384 |
| S3 | Aspheric | 11.7572 | 0.3000 | 1.68 | 19.2 | −15.23 | 25.5753 |
| S4 | Aspheric | 5.4389 | 0.4057 | | | | 2.3428 |
| S5 | Aspheric | −39.2085 | 0.3000 | 1.68 | 19.2 | −45.84 | 99.0000 |
| S6 | Aspheric | 150.0000 | 0.1276 | | | | −99.0000 |
| S7 | Aspheric | 30.3157 | 0.4647 | 1.55 | 56.1 | 30.05 | −67.5429 |
| S8 | Aspheric | −35.5692 | 0.5723 | | | | −68.3777 |
| S9 | Aspheric | 7.5110 | 0.4500 | 1.57 | 37.3 | −152.85 | −29.7191 |
| S10 | Aspheric | 6.7648 | 0.5526 | | | | −30.4161 |
| S11 | Aspheric | 3.5589 | 0.6506 | 1.55 | 56.1 | 7.41 | −1.0000 |
| S12 | Aspheric | 27.6028 | 0.9615 | | | | 8.6237 |
| S13 | Aspheric | −2.4262 | 0.5618 | 1.54 | 55.7 | −4.09 | −3.5200 |
| S14 | Aspheric | 25.0652 | 0.1836 | | | | 25.1392 |
| S15 | Spherical | Infinite | 0.2100 | 1.51 | 64.2 | | |
| S16 | Spherical | Infinite | 0.3847 | | | | |
| S17 | Spherical | Infinite | | | | | |

TABLE 16

| Surface number | A4 | A6 | A8 | A10 | A12 |
|---|---|---|---|---|---|
| S1 | 4.5313E−04 | 2.3479E−03 | −2.8643E−03 | 1.7922E−03 | −2.6285E−05 |
| S2 | −1.9408E−02 | 9.6129E−03 | 1.8000E−02 | −4.1347E−02 | 4.2996E−02 |
| S3 | −2.6816E−02 | 2.7208E−02 | 2.1941E−03 | −2.8828E−02 | 3.6980E−02 |
| S4 | −3.0232E−03 | 7.1129E−03 | 4.2510E−02 | −1.1504E−01 | 1.6085E−01 |
| S5 | −2.9228E−02 | 1.0067E−02 | −5.4668E−03 | −1.4668E−02 | 3.7007E−02 |
| S6 | −4.1432E−02 | 3.4445E−02 | −4.4231E−02 | 4.6384E−02 | −3.5552E−02 |
| S7 | −4.9944E−02 | 4.2619E−02 | −7.2791E−02 | 9.4163E−02 | −9.0192E−02 |
| S8 | −4.0445E−02 | 1.7590E−02 | −1.8187E−02 | 8.7410E−03 | −6.5721E−04 |
| S9 | −5.4781E−02 | 2.1387E−02 | −7.3331E−03 | −5.6050E−04 | 1.1641E−03 |
| S10 | −7.0446E−02 | 2.7242E−02 | −9.7672E−03 | 2.4964E−03 | −5.4520E−04 |
| S11 | −2.7423E−02 | −3.0062E−03 | 2.2008E−03 | −7.8054E−04 | 1.5632E−04 |
| S12 | 1.2585E−02 | −1.3159E−02 | 4.3073E−03 | −8.9940E−04 | 1.2643E−04 |
| S13 | −2.0648E−02 | 4.7935E−05 | 1.6291E−03 | −3.4901E−04 | 3.6250E−05 |
| S14 | −1.3147E−02 | 1.0256E−03 | 1.7906E−04 | −6.3434E−05 | 7.9420E−06 |

TABLE 16-continued

| Surface number | A14 | A16 | A18 | A20 |
|---|---|---|---|---|
| S1 | −7.0025E−04 | 4.3081E−04 | −1.1366E−04 | 1.1180E−05 |
| S2 | −2.6751E−02 | 9.9938E−03 | −2.0593E−03 | 1.7977E−04 |
| S3 | −2.6203E−02 | 1.1109E−02 | −2.5984E−03 | 2.5884E−04 |
| S4 | −1.3688E−01 | 7.0628E−02 | −2.0232E−02 | 2.4756E−03 |
| S5 | −4.0289E−02 | 2.3954E−02 | −7.4764E−03 | 9.5953E−04 |
| S6 | 1.9975E−02 | −7.7206E−03 | 1.8921E−03 | −2.1644E−04 |
| S7 | 5.8942E−02 | −2.4482E−02 | 5.7741E−03 | −5.7861E−04 |
| S8 | −2.2413E−03 | 1.4651E−03 | −4.0139E−04 | 4.3116E−05 |
| S9 | −3.6571E−04 | 4.1523E−05 | 9.9241E−07 | −3.6205E−07 |
| S10 | 1.2242E−04 | −2.0104E−05 | 1.7761E−06 | −6.2425E−08 |
| S11 | −1.7337E−05 | 1.0665E−06 | −3.3712E−08 | 3.8788E−10 |
| S12 | −1.1540E−05 | 6.4622E−07 | −2.0048E−08 | 2.6301E−10 |
| S13 | −2.1990E−06 | 7.9877E−08 | −1.6210E−09 | 1.4203E−11 |
| S14 | −5.4231E−07 | 2.1386E−08 | −4.5584E−10 | 4.0490E−12 |

Figure 16A:
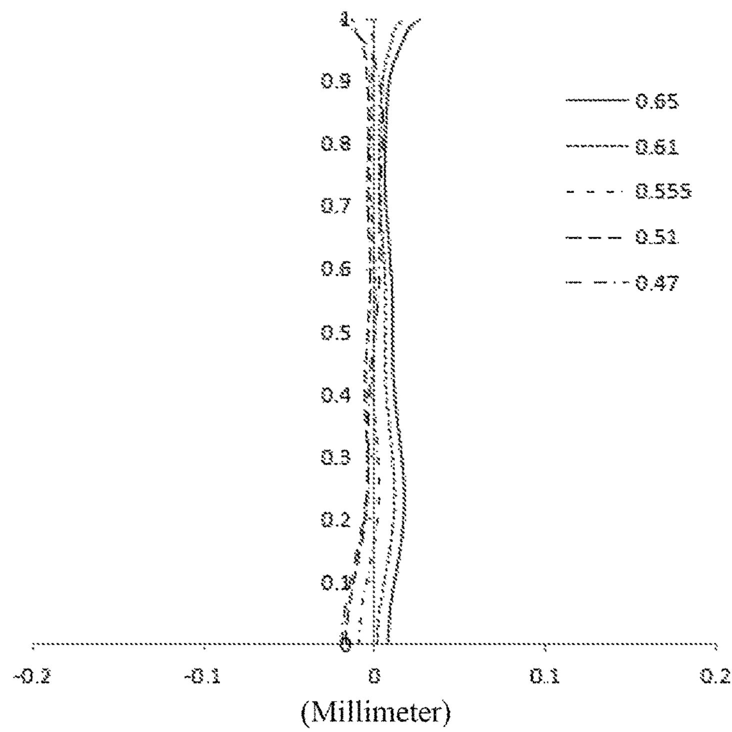
FIGS. 16A to 16D illustrate a longitudinal aberration curve, an astigmatic curve, a distortion curve, and a lateral color curve of the optical imaging lens assembly of the Example 8, respectively.
Figure 16B:
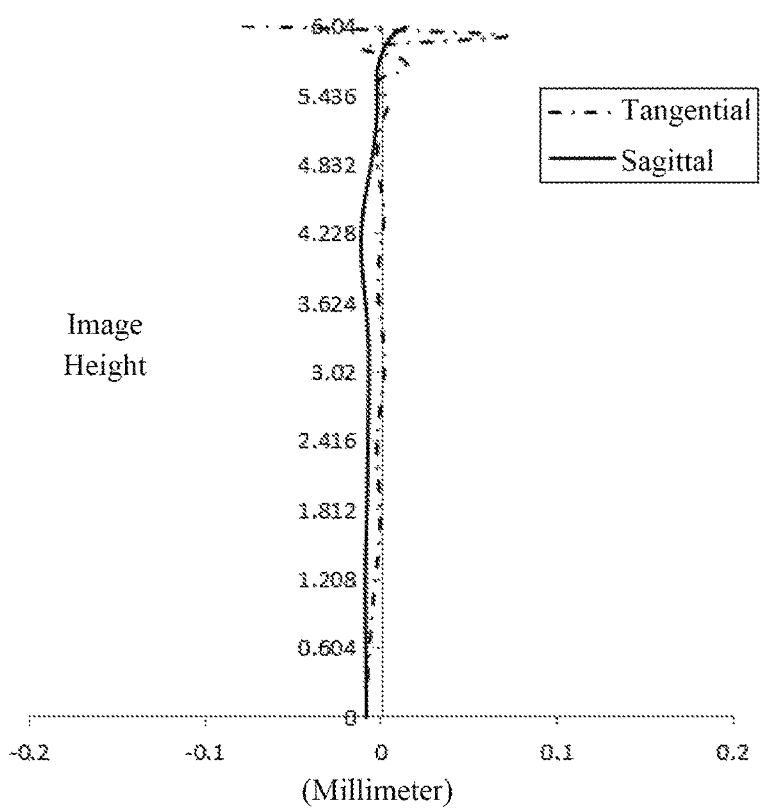
Figure 16C:
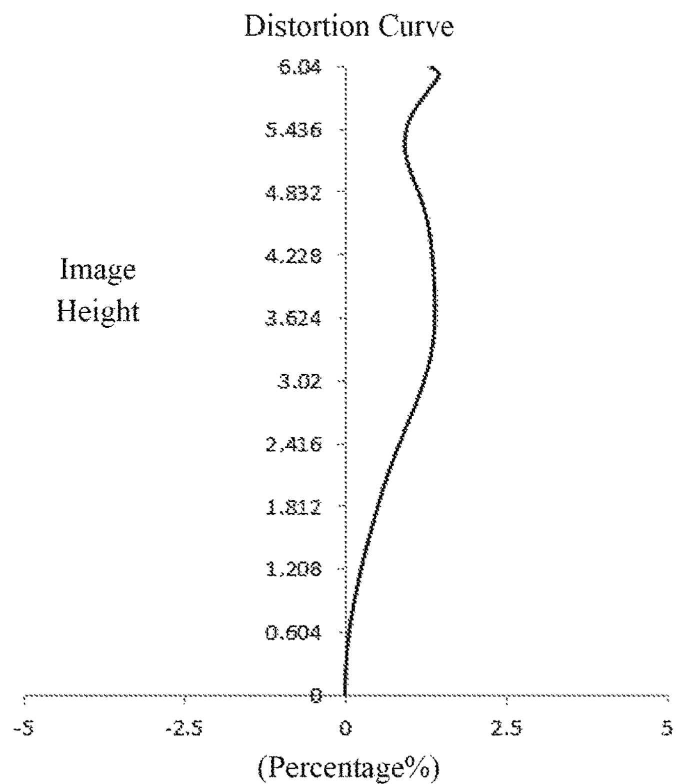
Figure 16D:
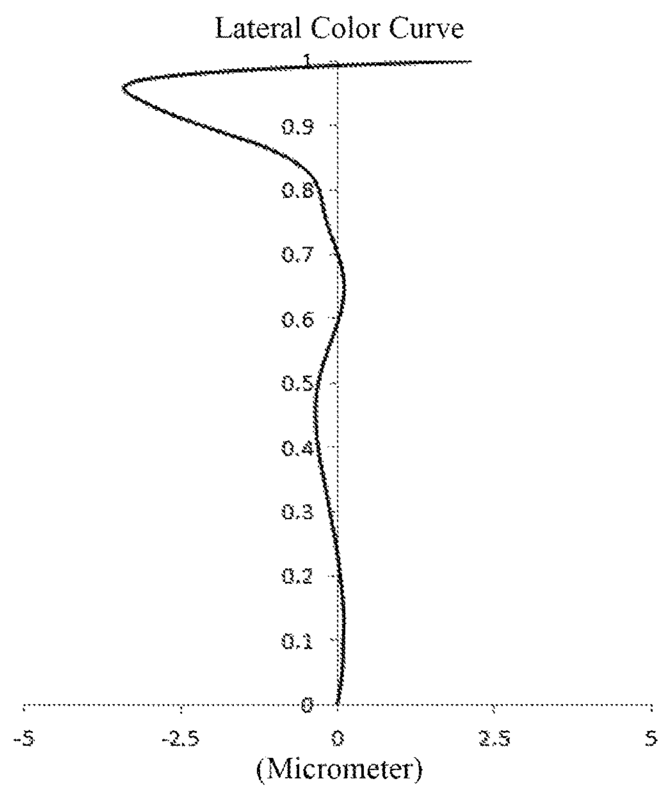

FIG. 16A illustrates a longitudinal aberration curve of the optical imaging system according to Example 8, representing deviations of focal points converged by light of different wavelengths after passing through the system. FIG. 16B illustrates an astigmatic curve of the optical imaging system according to Example 8, representing a curvature of a tangential plane and a curvature of a sagittal plane. FIG. 16C illustrates a distortion curve of the optical imaging system according to Example 8, representing amounts of distortion corresponding to different image heights. FIG. 16D illustrates a lateral color curve of the optical imaging system according to Example 8, representing deviations of different image heights on an imaging plane after light passes through the system. It can be seen from FIG. 16A to FIG. 16D that the optical imaging system provided in Example 8 may achieve good image quality.

In view of the above, Examples 1 to 8 respectively satisfy the relationship shown in Table 17.

TABLE 17

| Conditional | Example 1 | 2 | 3 | 4 | 5 | 6 | 7 | 8 |
|---|---|---|---|---|---|---|---|---|
| TTL/ImgH | 1.16 | 1.16 | 1.17 | 1.18 | 1.18 | 1.18 | 1.18 | 1.18 |
| f6/f | 1.59 | 1.45 | 1.38 | 1.30 | 1.29 | 1.23 | 1.19 | 1.21 |
| f6/f1 | 1.52 | 1.67 | 1.59 | 1.52 | 1.51 | 1.42 | 1.35 | 1.38 |
| SAG51/SAG42 | 2.46 | 1.87 | 1.56 | 1.65 | 1.65 | 1.56 | 1.49 | 1.39 |
| R3/f | 1.34 | 2.65 | 2.86 | 2.86 | 2.72 | 2.23 | 1.85 | 1.93 |
| T34/ET6 | 0.46 | 0.53 | 0.55 | 0.47 | 0.47 | 0.39 | 0.31 | 0.33 |
| (R9 + R10)/R10 | 1.91 | 1.70 | 1.84 | 2.13 | 2.11 | 2.03 | 2.05 | 2.11 |
| f2/f1 | −5.53 | −3.15 | −3.00 | −2.76 | −2.76 | −2.80 | −2.88 | −2.84 |
| f/EPD | 1.71 | 1.86 | 1.86 | 1.86 | 1.88 | 1.88 | 1.88 | 1.88 |
| TTL/EPD | 1.92 | 2.09 | 2.12 | 2.13 | 2.16 | 2.17 | 2.19 | 2.18 |
| f123/f | 1.16 | 1.15 | 1.16 | 1.17 | 1.20 | 1.32 | 1.43 | 1.38 |
| SAG61/(SAG62 − SAG71) | −2.59 | −3.64 | −2.15 | −2.13 | −2.00 | −1.59 | −1.49 | −1.42 |
| T23/T34 | 1.85 | 2.02 | 1.93 | 1.93 | 1.93 | 2.71 | 3.63 | 3.18 |

The present disclosure further provides an imaging apparatus, which is provided with an electronic photosensitive element for imaging. The electronic photosensitive element may be a photosensitive Charge-Coupled Device (CCD) or a Complementary Metal-Oxide Semiconductor (CMOS). The imaging apparatus may be an independent imaging device such as a digital camera, or may be an imaging module integrated in a mobile electronic device such as a mobile phone. The imaging apparatus is equipped with the optical imaging system described above.

The foregoing is only a description of the preferred examples of the present disclosure and the applied technical principles. It should be appreciated by those skilled in the art that the protective scope of the present disclosure is not limited to the technical solutions formed by the particular combinations of the above technical features. The protective scope should also cover other technical solutions formed by any combinations of the above technical features or equivalent features thereof without departing from the concept of the invention, such as, technical solutions formed by replacing the features as disclosed in the present disclosure with (but not limited to), technical features with similar functions.

What is claimed is:

1. An optical imaging system, sequentially from an object side to an image side of the optical imaging system along an optical axis, comprising:

a first lens having positive refractive power;

a second lens having negative refractive power;

a third lens having refractive power;

a fourth lens having positive refractive power;

a fifth lens having refractive power;

a sixth lens having positive refractive power; and a seventh lens having negative refractive power, an object-side surface of the seventh lens is a concave surface, and an image-side surface of the seventh lens is a concave surface, wherein ImgH>6.0 mm, and $$f/EPD<1.9,$$

where ImgH is half of a diagonal length of an effective pixel area on an imaging plane of the optical imaging system, f is a total effective focal length of the optical imaging system and EPD is an entrance pupil diameter of the optical imaging system.

wherein TTL/ImgH≤1.18, where TTL is a distance along the optical axis from an object-side surface of the first lens to the imaging plane of the optical imaging system.

2. The optical imaging system according to claim 1, wherein 1.15<f6/f<1.65, where f6 is an effective focal length of the sixth lens, and f is the total effective focal length of the optical imaging system.

3. The optical imaging system according to claim 1, wherein 1.3<f6/f1<1.7, where f1 is an effective focal length of the first lens, and f6 is an effective focal length of the sixth lens.

4. The optical imaging system according to claim 1, wherein 1.2<SAG51/SAG42<2.5, where SAG42 is a distance along the optical axis from an intersection of an image-side surface of the fourth lens and the optical axis to a vertex of an effective radius of the image-side surface of the fourth lens, and SAG51 is a distance along the optical axis from an intersection of an object-side surface of the fifth lens and the optical axis to a vertex of an effective radius of the object-side surface of the fifth lens.

5. The optical imaging system according to claim 1, wherein 1.3<R3/f<3, where R3 is a radius of curvature of an object-side surface of the second lens, and f is the total effective focal length of the optical imaging system.

6. The optical imaging system according to claim 1, wherein $$0.2<T34/ET6<0.6,$$

where T34 is a spaced interval between the third lens and the fourth lens along the optical axis, and ET6 is an edge thickness of the sixth lens.

7. The optical imaging system according to claim 1, wherein 1.5<(R9+R10)/R10<2.3, where R9 is a radius of curvature of an object-side surface of the fifth lens, and R10 is a radius of curvature of an image-side surface of the fifth lens.

8. The optical imaging system according to claim 1, wherein −6.0<f2/f1<−2.5, where f1 is an effective focal length of the first lens, and f2 is an effective focal length of the second lens.

9. The optical imaging system according to claim 1, 6.2 mm>ImgH>6.0 mm.

10. The optical imaging system according to claim 1, wherein TTL/EPD<2.5, where TTL is a distance along the optical axis from an object-side surface of the first lens to the imaging plane of the optical imaging system, and EPD is the entrance pupil diameter of the optical imaging system.

11. The optical imaging system according to claim 1, wherein 1.0<f123/f<1.5, where f123 is a combined focal length of the first to the third lenses, and f is the total effective focal length of the optical imaging system.

12. The optical imaging system according to claim 1, wherein −4<SAG61/(SAG62−SAG71 )<−1, where SAG61 is a distance along the optical axis from an intersection of an object-side surface of the sixth lens and the optical axis to a vertex of an effective radius of the object-side surface of the sixth lens, SAG62 is a distance along the optical axis from an intersection of an image-side surface of the sixth lens and the optical axis to a vertex of an effective radius of the image-side surface of the sixth lens, and SAG71 is a distance along the optical axis from an intersection of the object-side surface of the seventh lens and the optical axis to a vertex of an effective radius of the object-side surface of the seventh lens.

13. The optical imaging system according to claim 1, wherein an object-side surface of the fifth lens is a convex surface, and an object-side surface of the sixth lens is a convex surface.

14. An optical imaging system, sequentially from an object side to an image side of the optical imaging system along an optical axis, comprising:

a first lens having refractive power;

a second lens having negative refractive power;

a third lens having refractive power;

a fourth lens having positive refractive power;

a fifth lens having refractive power;

a sixth lens having refractive power; and a seventh lens having refractive power, an object-side surface of the seventh lens is a concave surface, and an image-side surface of the seventh lens is a concave surface, wherein 1.15<f6/f<1.65, and $$-4<SAG61/(SAG62-SAG71)<-1,$$

where f6 is an effective focal length of the sixth lens, f is a total effective focal length of the optical imaging system, SAG61 is a distance along the optical axis from an intersection of an object-side surface of the sixth lens and the optical axis to a vertex of an effective radius of the object-side surface of the sixth lens, SAG62 is a distance along the optical axis from an intersection of an image-side surface of the sixth lens and the optical axis to a vertex of an effective radius of the image-side surface of the sixth lens, and SAG71 is a distance along the optical axis from an intersection of the object-side surface of the seventh lens and the optical axis to a vertex of an effective radius of the object-side surface of the seventh lens.

15. The optical imaging system according to claim 14, wherein TTL/ImgH<1.2, where ImgH is half of a diagonal length of an effective pixel area on an imaging plane of the optical imaging system, and TTL is a distance along the optical axis from an object-side surface of the first lens to the imaging plane of the optical imaging system.

16. The optical imaging system according to claim 14, wherein ImgH>6.0 mm, where ImgH is half of a diagonal length of an effective pixel area on an imaging plane of the optical imaging system.

17. The optical imaging system according to claim 14, wherein 1.3<f6/f1<1.7, where f1 is an effective focal length of the first lens, and f6 is the effective focal length of the sixth lens.

18. The optical imaging system according to claim 14, wherein −6.0<f2/f1<−2.5, where f1 is an effective focal length of the first lens, and f2 is an effective focal length of the second lens.

19. The optical imaging system according to claim 14, wherein TTL/EPD<2.5, where TTL is a distance along the optical axis from an object-side surface of the first lens to an imaging plane of the optical imaging system, and EPD is an entrance pupil diameter of the optical imaging system.

20. The optical imaging system according to claim 14, wherein 1.0<f123/f<1.5, where f123 is a combined focal length of the first to the third lenses, and f is the total effective focal length of the optical imaging system.

* * * * *